US009674776B2

(12) United States Patent
Park et al.

(10) Patent No.: US 9,674,776 B2
(45) Date of Patent: Jun. 6, 2017

(54) COMMUNICATIONS METHODS AND APPARATUS THAT FACILITATE DISCOVERY OF SMALL COVERAGE AREA BASE STATIONS

(71) Applicant: QUALCOMM Incorporated, San Diego, CA (US)

(72) Inventors: Vincent Douglas Park, Budd Lake, NJ (US); Nilesh Nilkanth Khude, Somerset, NJ (US); Junyi Li, Chester, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/145,274

(22) Filed: May 3, 2016

(65) Prior Publication Data
US 2016/0249284 A1 Aug. 25, 2016

Related U.S. Application Data

(62) Division of application No. 13/802,742, filed on Mar. 14, 2013, now Pat. No. 9,374,770.

(51) Int. Cl.
*G08C 17/00* (2006.01)
*H04W 48/16* (2009.01)
(Continued)

(52) U.S. Cl.
CPC ........... *H04W 48/16* (2013.01); *H04W 48/08* (2013.01); *H04W 52/0209* (2013.01);
(Continued)

(58) Field of Classification Search
CPC ........... H04W 72/042; H04W 72/0453; H04W 72/0446; H04W 24/02; H04W 72/0413;
(Continued)

(56) References Cited

U.S. PATENT DOCUMENTS 8,194,609 B2  6/2012 Kalhan
8,619,706 B2 * 12/2013 Kalhan ................. H04W 88/10
                                                       370/331
(Continued)

FOREIGN PATENT DOCUMENTS

WO  WO-2011019976 A1  2/2011
WO  WO-2012037236 A2  3/2012
WO  WO-2012037476 A1  3/2012

OTHER PUBLICATIONS

ISA/EPO, Partial International Search Report of the International Searching Authority, Int'l. App. No. PCT/US2014/021051, Jul. 23, 2014, European Patent Office, Rijswijk, NL, 7 pgs.
(Continued)

*Primary Examiner* — Michael J Moore, Jr.
(74) *Attorney, Agent, or Firm* — Holland & Hart LLP

(57) ABSTRACT

A communications system includes a plurality of different types of small coverage area base stations, e.g., femto cell base stations, WiFi access points and Bluetooth access points within a macro cell. Different user equipment (UE) devices, e.g., different smartphones, include different capabilities. In order for UE devices and small coverage area base stations with compatible capabilities to efficiently discover one another, the various small coverage area base stations and various UE devices utilize the macro cell communications band and macro cell communication protocol to coordinate device discovery and exchange discovery information and control information which allows a UE device to access a compatible small coverage area base station and subsequently communicate user data, e.g., traffic data, with the UE device.

18 Claims, 14 Drawing Sheets

(51) Int. Cl.
*H04W 52/02* (2009.01)
*H04W 48/08* (2009.01)
*H04W 84/04* (2009.01)

(52) U.S. Cl.
CPC ...... *H04W 52/0274* (2013.01); *H04W 84/045* (2013.01); *Y02B 60/50* (2013.01)

(58) Field of Classification Search
CPC .... H04W 84/045; H04W 48/16; H04L 5/001; H04L 5/0048
See application file for complete search history.

(56) References Cited

U.S. PATENT DOCUMENTS

| | | |
|---|---|---|
| 2005/0180454 A1 | 8/2005 | Lee et al. |
| 2007/0123260 A1 | 5/2007 | Kim et al. |
| 2008/0118014 A1 | 5/2008 | Reunamaki et al. |
| 2009/0215400 A1 | 8/2009 | Chang et al. |
| 2010/0151858 A1* | 6/2010 | Brisebois .............. H04W 24/10 455/434 |
| 2010/0260052 A1 | 10/2010 | Cho et al. |
| 2010/0279689 A1 | 11/2010 | Tinnakornsrisuphap et al. |
| 2011/0128916 A1 | 6/2011 | Kwon et al. |
| 2011/0141939 A1 | 6/2011 | Medapalli |
| 2011/0194530 A1* | 8/2011 | Tinnakornsrisuphap H04W 36/04 370/331 |
| 2012/0002638 A1 | 1/2012 | Huh |
| 2012/0015649 A1 | 1/2012 | Li et al. |
| 2012/0106516 A1 | 5/2012 | Jung et al. |
| 2013/0023267 A1 | 1/2013 | Ong et al. |
| 2013/0059586 A1 | 3/2013 | Hao et al. |
| 2013/0065600 A1 | 3/2013 | Lim |
| 2013/0137423 A1* | 5/2013 | Das ....................... H04W 12/08 455/426.1 |
| 2013/0225182 A1 | 8/2013 | Singh et al. |
| 2014/0069464 A1 | 3/2014 | Puls et al. |
| 2015/0257065 A1* | 9/2015 | Frederiksen ...... H04W 52/0206 370/331 |
| 2015/0327093 A1* | 11/2015 | Yang .................... H04W 48/16 370/252 |
| 2015/0373628 A1* | 12/2015 | Hwang ................ H04W 48/16 370/338 |

OTHER PUBLICATIONS

ISA/EPO, International Search Report and Written Opinion of the International Searching Authority, Int'l. App. No. PCT/US2014/021051, Sep. 22, 2014, European Patent Office, Rijswijk, NL, 20 pgs.

IPEA/EPO, Second Written Opinion of the International Preliminary Examining Authority, Int'l. App. No. PCT/US2014/021051, Apr. 16, 2015, European Patent Office, Munich, DE, 13 pgs.

* cited by examiner

SMALL COVERAGE AREA BASE STATION TRANSMITTED DISCOVERY SIGNAL

UE DEVICE DISCOVERY SIGNAL

REQUEST SIGNAL FROM THE SMALL COVERAGE AREA BASE STATION TO
THE MACRO BASE STATION

SIGNAL TO UE DEVICE INCLUDING INFORMATION ABOUT THE SMALL
COVERAGE AREA BASE STATION, E.G., WiFi AP

SIGNAL TO UE DEVICE INCLUDING INFORMATION ABOUT THE
SMALL COVERAGE AREA BASE STATION, E.G., FEMTO BS

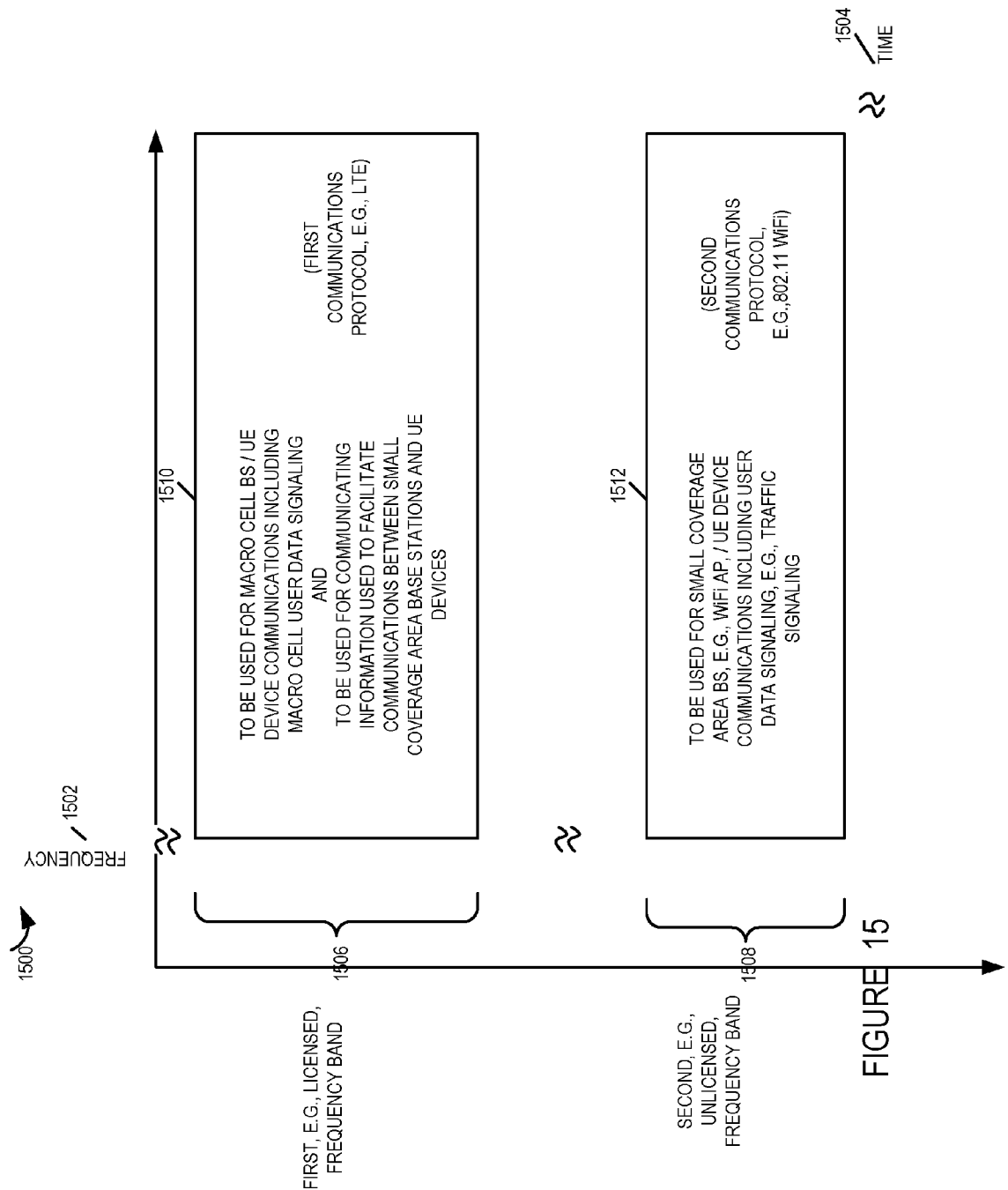

COMMUNICATIONS METHODS AND APPARATUS THAT FACILITATE DISCOVERY OF SMALL COVERAGE AREA BASE STATIONS

CROSS REFERENCES

The present Application for Patent is a divisional of U.S. patent application Ser. No. 13/802,742 by Park et al., entitled "Communications Methods and Apparatus That Facilitate Discovery of Small Coverage Area Base Stations," filed Mar. 14, 2013, assigned to the assignee hereof.

BACKGROUND

Field of the Disclosure

Various embodiments relate to wireless communications methods and apparatus and, more particularly, to wireless communications methods and apparatus that facilitate discovery of small coverage area base stations in communications systems.

Description of Related Art

Various user equipment (UE) devices, e.g., smartphones and other mobile communications devices, today are equipped with multiple modems that support a variety of technologies such as, e.g., LTE (Long Term Evolution), HSPA (High Speed Packet Access), Wifi, Bluetooth, etc. These technologies typically operate in different bands. Long term evolution (LTE) itself supports operation in multiple bands (carriers) to increase the data rates. LTE macro cell base station communications operate in a primary band while LTE small coverage area base stations may be deployed to use bands that are different from the primary band of the macro cells. In the near future LTE may also have LTE-WiFi aggregation for traffic offload.

In a system where a variety of different base stations are deployed including macro cellular base stations and small coverage area base stations including e.g., LTE femto cell base stations, WiFi access points, and/or Bluetooth APs, it would be beneficial if a UE device was able to discover the various small coverage area base stations deployed in different bands and/or using different technologies, in addition to being able to discover the macro cell base stations, to determine the best or most suitable interface to use for traffic. Most of the different technologies have different discovery mechanisms. Typically to discover a particular type of small coverage area base station, which uses a different technology than the used by the macro cell base station, the UE device needs to activate a particular modem corresponding to the technology and needs to keep searching for that type of small cell base station. Thus to search for both WiFi access points and Bluetooth APs, the UE device may need to active both types of modems and search using both types of modems. In the case of asynchronous technologies such as WiFi and Bluetooth, the search increases power consumption of the UE significantly and hampers the battery life, given that the UE devices have limited battery power and scanning for small coverage area base stations operating in various frequency bands can consume a significant amount of battery power. In the case where the deployed macro cells use LTE and at least some deployed small cell base stations, e.g., femto cells, also use LTE, the small cell base stations using LTE typically transmit in their respective bands, and the UE needs to tune to different bands to discover the different small cell base stations. During the time of searching for the small coverage area LTE base stations, the UE normally is not communicating with its macro base station, e.g., its eNB, in the macro cell in which the UE is located. This results in loss of throughput for an active UE.

In view of the above discussion it should be appreciated that there is a need for methods and/or apparatus which can facilitate efficient discovery of small coverage area base stations, e.g., femto cell base stations, pico cell base stations, WiFi access points, Bluetooth access points, etc. It would be desirable if the methods and/or apparatus are power efficient, reduce the time for discovering the set of small coverage area base stations in an area, and/or reduce the amount of overhead signaling over current approaches, thus improving throughput and/or reducing the amount of UE device battery drain expended for small coverage area base station searches.

SUMMARY

Various embodiments are directed to methods and apparatus facilitating communications between user equipment devices and small coverage area base stations. The small coverage area base stations, located within a macro cell corresponding to a macro cell base station, may include a wide range of different types, e.g, femto cell base stations, pico cell base stations, micro cell base stations, WiFi access points, Bluetooth access points, etc. Different small coverage area base stations may, and sometimes do, use different communications protocols and/or different frequency communications bands when communicating user data signals, e.g., traffic data signals including, e.g., voice data, image data, and/or video data, with a UE device. A particular user equipment (UE) device, e.g., a particular smartphone, supports communications using a plurality of different communications protocols and/or different frequency bands, e.g., depending upon the particular set of modems included in the UE device. Different UE devices in the communications system may include different capabilities.

In order to facilitate efficient discovery of small coverage area base stations by UE devices with compatible capabilities and/or the discovery of UE devices by small coverage area base stations with compatible capabilities, the UE devices and the small coverage area base stations utilize the communications protocol and communications band being used by the macro cell via which discovery information is communicated. The discovery information includes, e.g., identification information, device capability information, communications protocol information, communications band information, and/or information used by a UE device to access the small coverage area base station using at least one of a different communications protocol or a different communication band.

Thus various types of small coverage area base stations and UE devices, located within a macro cell, utilize a common first communications protocol and a common first frequency band to communicate device capability information and/or other control information used to support communications including user data signaling between the small coverage area base station and the UE device. The small coverage area base station and UE device, use the communicated control information, to reconfigure and subsequently communicate user data.

An exemplary method of operating a user equipment (UE) device, in accordance with some embodiments, includes: receiving, at a first modem in said UE device, a discovery signal via a first frequency band from a small coverage area base station, said discovery signal being in accordance with a first communications protocol; powering a second modem in said UE device in response to receiving said discovery signal; and operating said second modem to scan a second frequency band for a signal from said small coverage area base station in accordance with a second communications protocol or transmit a probe signal to said small coverage area base station in said second frequency band, said probe signal being in accordance with said second communications protocol, said second communications protocol being different from said first communications protocol. An exemplary user equipment (UE) device, in accordance with some embodiments, includes at least one processor configured to: operate a first modem in said UE device to receive a discovery signal via a first frequency band from a small coverage area base station, said discovery signal being in accordance with a first communications protocol; power a second modem in said UE device in response to receiving said discovery signal; and operate said second modem to scan a second frequency band for a signal from said small coverage area base station in accordance with a second communications protocol or transmit a probe signal to said small coverage area base station in said second frequency band, said probe signal being in accordance with said second communications protocol, said second communications protocol being different from said first communications protocol. The exemplary UE device further includes memory coupled to said at least one processor.

An exemplary method of operating a first base station, e.g., a small coverage area base station, in accordance with some embodiments, includes: monitoring a first frequency band used by a second base station to detect a signal transmitted by a UE device in said first frequency band and communicating information about said first base station to said UE device in response to said monitoring detecting a signal transmitted by a UE device in said first frequency band. An exemplary first base station, e.g., a small coverage area base station, in accordance with some embodiments means for monitoring a first frequency band used by a second base station to detect a signal transmitted by a UE device in said first frequency band and means for communicating information about said first base station to said UE device in response to said monitoring detecting a signal transmitted by a UE device in said first frequency band.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 15 is a drawing illustrating some exemplary frequency bands and some exemplary air link resources in accordance with an exemplary embodiment.

DETAILED DESCRIPTION

Figure 1:
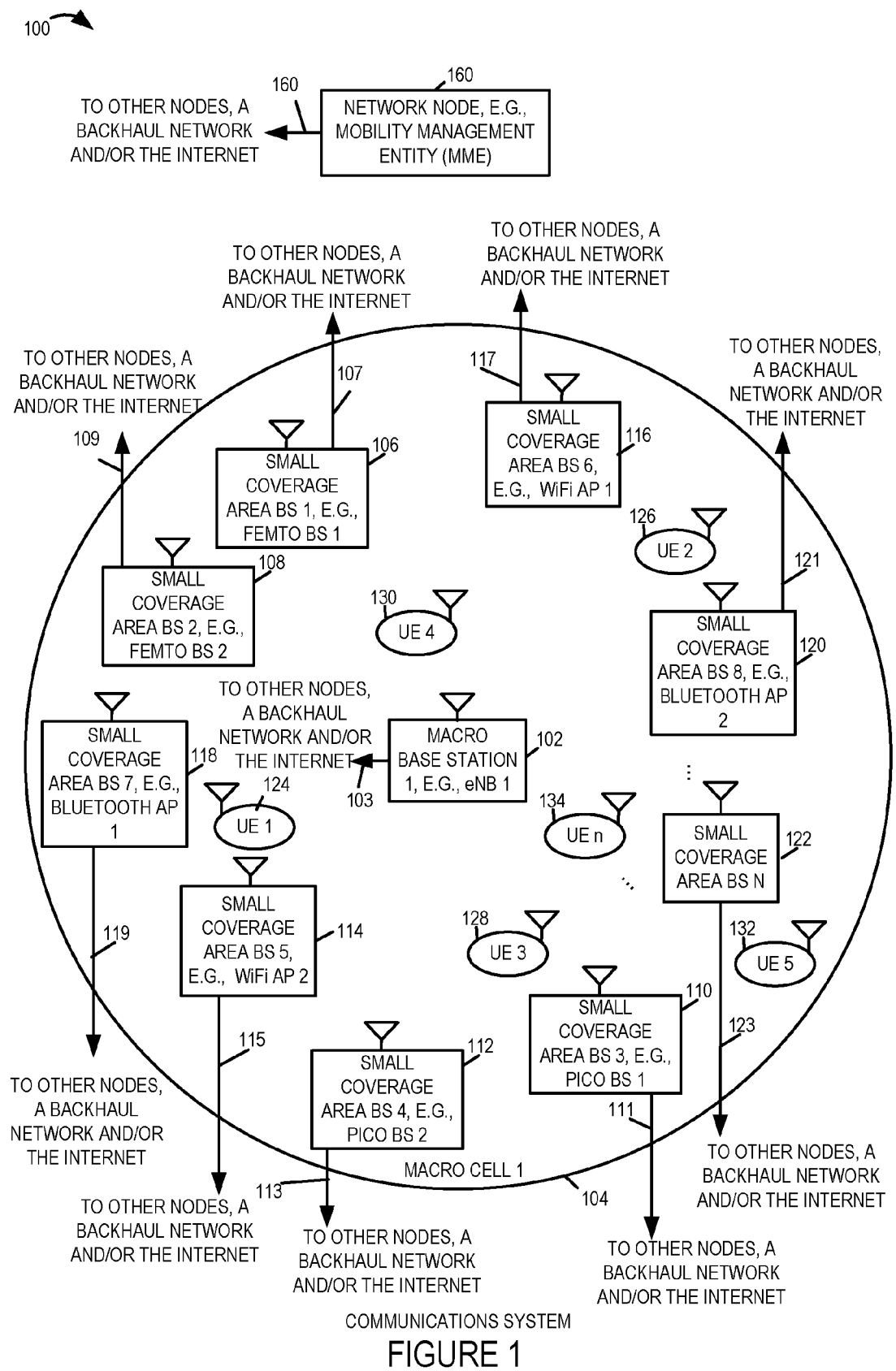
FIG. 1 illustrates an exemplary wireless communications system implemented in accordance with various exemplary embodiments.

FIG. 1 is a drawing of an exemplary communications system 100 in accordance with various exemplary embodiments. Exemplary communications system 100 includes a macro base station 1 102, e.g., eNodeB 1 (eNB 1), with a corresponding macro cellular coverage area, macro cell 1 104. Exemplary communications system 100 further includes a plurality of small coverage area base stations (small coverage area base station (BS) 1 106, e.g., femto BS 1, small coverage area BS 2 108, e.g., femto BS 2, small coverage area BS 3 110, e.g., pico BS 1, small coverage area BS 4 112, e.g., pico BS 2, small coverage area BS 5 114, e.g., WiFi access point (AP) 1, small coverage area BS 6 118, e.g., WiFi AP 2, small coverage area BS 7 118, e.g., Bluetooth AP 1, small coverage area BS 8 120, e.g., Bluetooth AP 2, . . . , small coverage area BS M 122), each with a corresponding coverage area. In some embodiments, the coverage area corresponding to a small coverage area BS is less than or equal to 50% of the coverage area of a macro cell with which the small coverage area base station is located.

Exemplary communications system 100 further includes a network node 160, e.g., a mobility management entity (MME). The macro base station 102, small coverage area base stations (104, 106, 108, 110, 112, 114, 116, 118, 120, . . . , 122), and network node 160, are coupled to other nodes, a backhaul network and/or the Internet, via links (103, 105, 107, 109, 111, 113, 115, 117, 119, 121, . . . , 123, 161), respectively. In various embodiments, system 100 further includes additional macro base stations, and additional small coverage area base stations located within the macro cells of the additional base stations. The additional macro base stations and additional small coverage area base stations are also coupled to other network nodes, the backhaul network, and/or the Internet.

Exemplary system 100 includes a plurality of user equipment (UE) devices, e.g., mobile wireless terminals, (UE device 1 124, UE device 2 126, UE device 3, 128, UE device 4 130, UE device 5 132, . . . , UE device n 134). Each of the UE devices (124, 126, 128, 1302, 132, . . . , 134) includes two of more modems, e.g., one modem for communicating with the macro base station 102 using a first communications protocol, and one or more additional modems for communicating with small coverage area base stations using different communications protocols. In some embodiments, different UE devices include different capabilities, e.g., support different sets of communications protocols and/or support communication in different sets of frequency bands.

In various embodiments, the small coverage area base stations and the UE devices use the first frequency band and first communications protocol used by the macro base station for communicating information about another communications protocols and/or another communications bands used by the small coverage area base stations and/or UE devices. In some such embodiments, the first frequency band and first communications protocol is used by UE devices and the small coverage area base stations to communicate discovery information; however, user data signaling, e.g., traffic data signaling, which is communicated between a UE device and a small coverage area base station, uses at least one of a different communications band than the first frequency band and a different communications protocol than the first communications protocol. In some embodiments, the first frequency band and the first communications protocol is used by UE devices and the small coverage area base stations to communicate discovery information; however, user data signaling, e.g., traffic data signaling, which is communicated between a UE device and a small coverage area base station, uses at least one of: a different communications band than the first frequency band, a different communications protocol than the first communications protocol, and different communication resources than the communications resources used by the macro base station.

Each small coverage area base station may be, e.g., one of: a femto cell base station, a picocell base station, a microcell base station, a WiFi AP, or a Bluetooth AP. A macro cell base station serves as an attachment point for at least some of the UEs in its coverage area, e.g., its macro cell. A macro base station 124 may, and in some embodiments is, implemented as an eNodeB. Femto cell base station is intended to be a term which is not technology specific and can be used to refer to any of a wide range of different types of femto cell base stations. The coverage area of the small coverage area base station is normally much smaller, e.g., less than 50% of the coverage area of the macro cell base station. Thus, as shown in FIG. 1, multiple small coverage area base stations may be within the coverage area of a single macro base station. The femto cell base stations in the present application are not intended to be limited to a particular technology unless expressly identified using a technology specific term. Femto cell base stations may be implemented as HeNB (Home eNode B) cells in LTE while in 3GPP terminology a Home Node B (HNB) is a femto cell base station. In some, but not necessarily all, embodiments a femto cell base station has a range (radius) from the femto cell base station on the order of 10 meters while a picocell base station has a range that is 200 meters or less. In some embodiments, a microcell base station has a range of approximate 12 meters. These ranges are considerably smaller than the typical range of a macro cell base station which may have, and sometimes does have, a range up to 35 kilometers (approximately 22 miles). While such a large range is possible for a macro base station, smaller ranges are often used for the macro base station.

Figure 2:
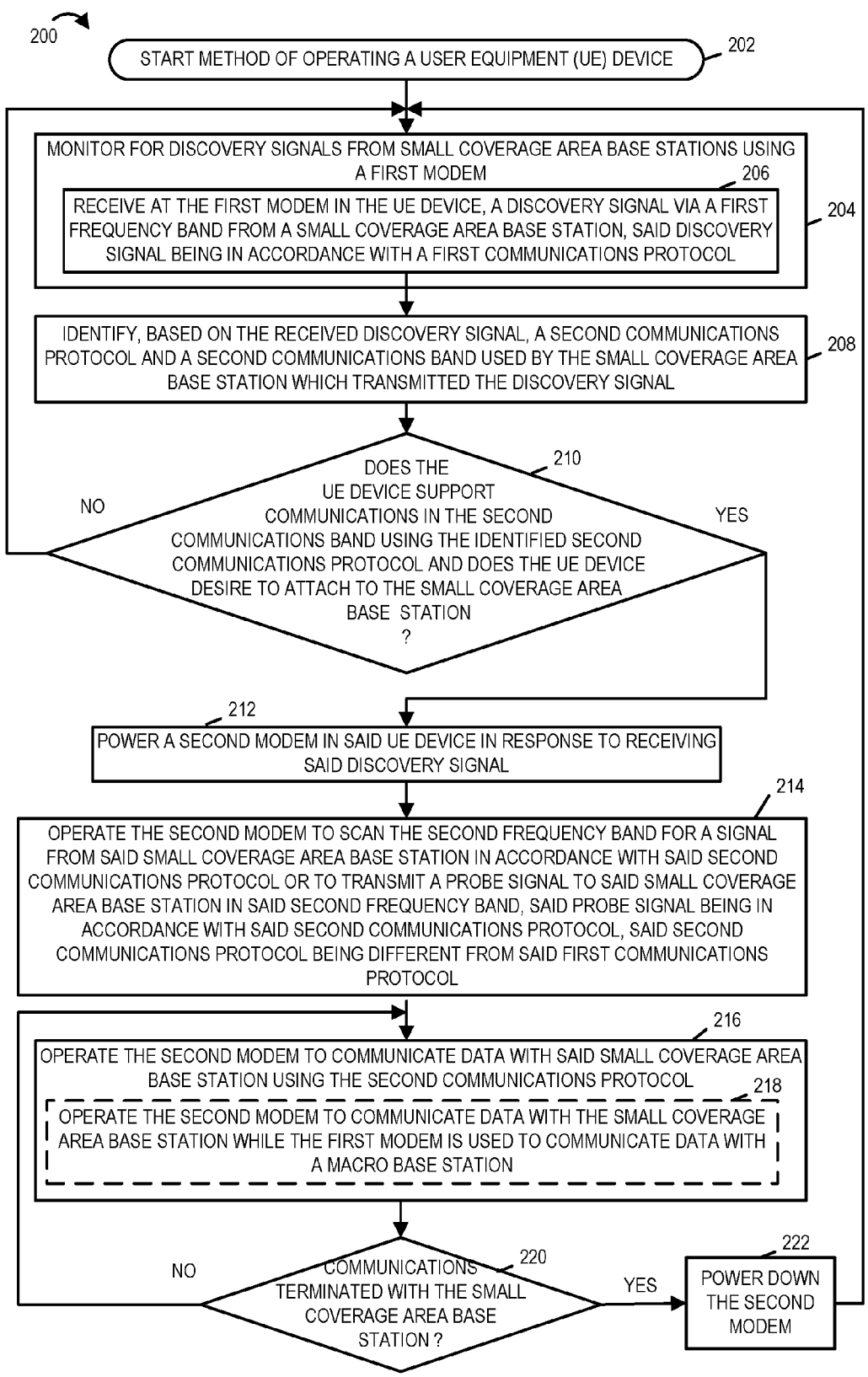
FIG. 2 is a flowchart of an exemplary method of operating a user equipment (UE) device in accordance with various exemplary embodiments.

FIG. 2 is a flowchart 200 of an exemplary method of operating a user equipment (UE) device in accordance with various embodiments. Operation starts in step 202, where the UE device is powered on and initialized. Operation proceeds from step 202 to step 204.

In step 204, the UE device monitors for discovery signals from small coverage area base stations using a first modem. Step 204 includes step 206 in which the UE device receives at the first modem in the UE device, a discovery signal via a first frequency band from a small coverage area base station, said discovery signal being in accordance with a first communications protocol. In some embodiments, the discovery signal is transmitted by the small coverage area base station. In some embodiments, the discovery signal is generated by the small coverage area base station and is communicated to the UE device via a macro base station.

Operation proceeds from step 206 to step 208. In step 208 the UE device identifies, based on the received discovery signal, a second communications protocol and a second communications band used by the small coverage area base station which transmitted the discovery signal. In some embodiments, the discovery signal directly communicates information identifying the second communications protocol and information identifying the second communications band. In some embodiments, the UE device decodes the received discovery signal to recover a small coverage area base station identifier, and then the UE device compares the recovered identifier to stored information in a look-up table in the UE device's memory to identify the second communications protocol and the second communications band which correspond to the small coverage area base station. In some embodiments, the UE device decodes the received discovery signal to recover identification information, and then the UE device communicates the recovered information to the macro base station, which, in response, transmits information communicating the second communications protocol and the second frequency band to the UE device. In some such embodiments, the macro base station serves as an intermediary for communications between the UE device and the MME. Operation proceeds from step 208 to step 210.

In step 210 the UE determines if the UE device supports communications in the identified second communications band using the identified second communications protocol and if the UE desires to attach to small coverage area base station which transmitted the received discovery signal. If the UE device does not support communications in the identified second communications band using the identified second communications protocol or the UE device does not desire to attach to the small coverage area base station, then operation proceeds from step 210 to step 204 for additional monitoring to attempt to detect discovery signals being transmitted by other small coverage area base stations. However, if the UE device supports communications in the identified second communications band using the identified second communications protocol and the UE device desires to attach to the small coverage area base station, then operation proceeds from step 210 to step 212.

In step 212, the UE device powers a second modem in said UE device in response to receiving a discovery signal. Operation proceeds from step 212 to step 214. In step 214, the UE device operates the second modem to scan the second frequency band for a signal from the small coverage area base station in accordance with said second communications protocol or to transmit a probe signal to said small coverage area base station in said second frequency band, said probe signal being in accordance with said second communications protocol, said second communications protocol being different from said first communications protocol. In some embodiments, if no UE devices are attached to the small coverage area base station, the small coverage area base station does not transmit into the second frequency band, e.g., to conserve power and to reduce interference. In some such embodiments, the probe signal from the UE device into the second frequency band wakes up the small coverage area base station to an active state of operation. In some embodiments, the probe signal transmitted by the UE device is an access request signal transmitted, e.g., transmitted on a set of air link resources known to both the UE and small coverage area base station. In some embodiments, particular air link resources to be used by the UE device for communications with the small coverage area base station, e.g., for downlink and uplink signaling, were previously communicated to the UE device in the first frequency band and received via the first modem prior to step 212, e.g., from the macro cell base station or from the small coverage area base station. Operation proceeds from step 214 to step 216.

In step 216, the UE device operates the second modem to communicate data with said small coverage area base station using the second communications protocol. Step 216 may, and sometimes does, include step 218 in which the UE device operates the second modem to communicate data with small coverage area base station while the first modem is used to communicate data with a macro base station. For example, in one embodiments, the first modem, e.g., an LTE modem, of the UE device is communicating data with a macro cell base station using an LTE protocol in the first frequency band, while the second modem, e.g., a WiFi modem, of the UE device is communicating data with a WiFi access point using an 802.11 protocol in the second communications band, and the first and second communications bands are different non-overlapping communications bands. In some embodiments, the UE device may, and sometimes does, operate the second modem to communicate data with the small coverage area base station while the first modem is used to receive discovery signals generated by a plurality of small coverage area base stations.

Operation proceeds from step 216 to step 218. In step 218 the UE device determines whether or not communications have been terminated with the small coverage area base station. Termination of communications between the UE device and the small coverage area base station may be for any one of a number of reasons including: the UE device moving outside the coverage area of the small coverage area base station, a decision by the UE device to terminate communications, e.g., a for lack of data to communicate, to conserve battery power, and/or due to a degradation in channel conditions, a decision by the small coverage area base station to terminate conditions, e.g., for a lack of data to communicate, due to loading conditions, and/or due to a degradation in channel conditions.

If the UE device determines in step 220, that communications with the small coverage area are still ongoing, then operation proceeds from step 220 to step 216, in which the second modem communicates additional data with the small coverage area base station using the second communications protocol. However, if the UE device determines in step 220 that communications have been terminated with the small coverage area base station, then operation proceeds from step 220 to step 222, in which the UE device powers down the second modem. Operation proceeds from step 222 to step 204, in which the UE device monitors for discovery signals from small coverage areas using the first modem.

In various embodiments, as part of initialization in step 202, the UE device powers up the first modem, e.g., fully or partially, and controls the second modem to remain powered down. In some embodiments, as part of initialization, in step 202, the UE device powers up a receiver portion of the first modem, and controls: the transmitter portion of the first modem, the receiver portion of the second modem, and the transmitter portion of the second modem to remain powered down. In some such embodiments, the transmitter portion of the first modem is powered on when the UE device seeks to use a macro base station as an attachment point.

In some embodiments, the first modem is configured for communication with a macro base station via the first frequency band. In some embodiments, the first frequency band is a licensed frequency band and the second frequency band is an unlicensed frequency band. In some embodiments, the first communications protocol is a cellular wireless radio protocol, e.g. an LTE protocol.

In some embodiments, the first modem is an LTE modem and the second modem is an 802.11 modem. In some other embodiments, the first modem is an LTE modem, and the second modem is a Bluetooth modem. In some embodiments, the first modem is an LTE modem, the first communications protocol is an LTE protocol which supports peer to peer discovery, and the discovery signal transmitted by the small coverage area base station into the first communications band is a LTE direct discovery signal.

In various embodiments, the first communications protocol is a time synchronous protocol.

In some embodiments, the exemplary method further includes a step in which the UE device transmits a second discovery signal using the first modem in the first frequency band in accordance with the first communications protocol. In some such embodiments, the second discovery signal includes identification information of the UE device, capability of the second modem, and QoS requirements of the UE device.

Figure 3:
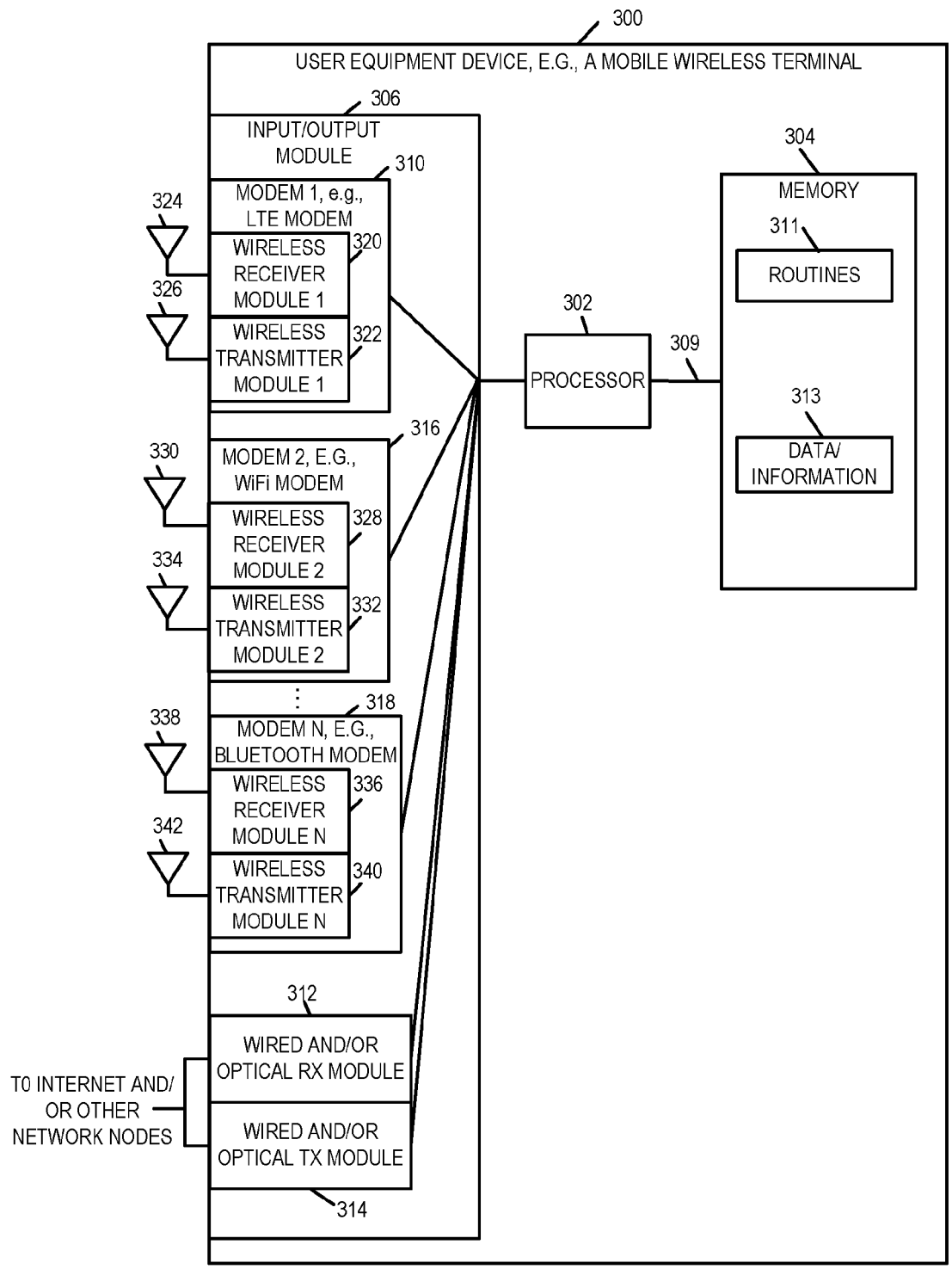
FIG. 3 illustrates an exemplary user equipment (UE) device in accordance with various exemplary embodiments.

FIG. 3 illustrates an exemplary user equipment (UE) device 300, in accordance with various embodiments. Exemplary UE device 300 can be used as any one of the UE devices shown in FIG. 1. The exemplary UE device 300 may, and sometimes does, implement a method in accordance with flowchart 200.

The UE device 200 includes a processor 302 and memory 304 coupled together via a bus 309 over which the various elements (302, 304) may interchange data and information. The UE device 300 further includes an input/output module 306 which may be coupled to processor 302 as shown.

However, in some embodiments, the input/output module 306 is located internal to the processor 302. The input/output module 306 in some embodiments includes a plurality of modems that support different technologies and/or different frequency bands (modem 1 310, modem 2 316, . . . , modem N 318). Modem 1 310, e.g., an LTE modem, includes a wireless receiver module 1 320 coupled to wireless communications receive antenna 324 and a wireless transmitter module 1 322 coupled to wireless communications transmit antenna 326. Modem 1 310 supports a first communications protocol, e.g., a cellular wireless radio protocol. The wireless receiver module 1 320 of modem 1 310 is configured to receive input over wireless communications links in a first frequency band and the wireless transmitter module 1 922 is configured to transmit output over wireless communications links in the first frequency band. In some embodiments the first frequency band is a licensed frequency band. In some embodiments the first frequency band is an LTE discovery band. In some embodiments, the same antenna is used for both input and output wireless communications signaling.

Modem 2 316, e.g., a WiFi modem, includes a wireless receiver module 2 328 coupled to a wireless communications receive antenna 330 and a wireless transmitter module 2 332 coupled to a wireless communications transmit antenna 334. In various embodiments modem 2 316 supports a particular communications protocol, e.g., a 802.11 communications protocol. In some embodiments modem 2 316 supports a plurality of related communications protocols, e.g., a set of 802.11 different variation communications protocol, and modem 2 316 is configured to communicate in a particular selected communications protocol. The wireless receiver module 2 328 of modem 2 316 is configured to receive input over wireless communications links in a particular frequency band and the wireless transmitter module 2 332 is configured to transmit output over wireless communications links in a particular frequency band. In some embodiments the particular frequency band is an unlicensed frequency band. In some embodiments, the same antenna is used for both input and output wireless communications signaling.

Modem N 318 includes a wireless receiver module N 336 coupled to a wireless communications receive antenna 338 and a wireless transmitter module N 340 coupled to a wireless communications transmit antenna 342. In various embodiments modem N 318 supports an Nth communications protocol, e.g., Bluetooth communications protocol. The wireless receiver module N 336 of modem N 318 is configured to receive input over wireless communications links in a particular frequency band and the wireless transmitter module N 340 is configured to transmit output over wireless communications links in a particular frequency band. In some embodiments the particular frequency band is an unlicensed frequency band. In some embodiments, the same antenna is used for both input and output wireless communications signaling.

In some embodiments, the same antenna is used by multiple modems. In some embodiments, the same antenna or pair of antennas is shared by multiple modems, e.g., by modem 2 316 and modem 318. In some embodiments, the same antenna or pair of antennas is switched between multiple modems, e.g., switched to the particular modem (316, . . . , 318) which is powered on.

In various embodiments, the first modem referred to in flowchart 200 is modem 1 314; and the second modem referred to in flowchart 200 is one selected modem of modems (modem 2 316, . . . modem N 318), and the second frequency band referred in flowchart 200 is the particular frequency band corresponding to the selected modem. In various embodiments, the first modem 314 can be, and sometime is, configured to operate in a first frequency band which is the macro cell frequency band, and one of the other modems (modem 2 316, . . . , modem N 318) can be, and sometimes is, configured to operate in a different frequency band, e.g., a different non-overlapping frequency band corresponding to a particular small coverage area base station. In some embodiments, each of the modems (modem 1 314, modem 2, . . . , modem N) correspond to different frequency bands, e.g., different non-overlapping frequency bands. In some embodiments, the modem 1 314 can be, and sometimes is, configured to operate in different frequency bands at different times, e.g., an LTE macro cell band during some times, e.g., during discovery, and an LTE femto cell band during other times, e.g., while communicating with an LTE femto cell base station and communicating user data signals.

The input/output module 306 in some embodiments further includes a wired and/or optical receiver module 312 for receiving input over a wired and/or optical link and a wired and/or optical transmitter module 314 for transmitting output signals over a wired and/or optical link. Memory 304 includes routines 311, and data/information 313.

In some embodiments, processor 302 is configured to: operate a first modem to receive a discovery signal via a first frequency band from a small coverage area base station, said discovery signal being in accordance with a first communications protocol; power a second modem in said UE device in response to receiving said discovery signal; and operate said second modem to scan a second frequency band for a signal from said small coverage area base station in accordance with a second communications protocol or transmit a probe signal to said small coverage area base station in said second frequency band, said probe signal being in accordance with said second communications protocol, said second communications protocol being different from said first communications protocol.

In one exemplary embodiment, the first modem is an LTE modem; the small coverage area base station is a WiFi access point or Bluetooth access point; the first communications protocol is an LTE protocol, e.g., an LTE protocol which supports peer to peer discovery; the discovery signal is an LTE direct discovery signal; and the second modem is one of a 802.11 modem or Bluetooth modem.

In some embodiments, said first modem is configured for communication with a macro base station via the first frequency band. In some such embodiments, processor 302 is further configured to: operate the second modem to communicate data with said small coverage area base station while said first modem is used to communicate data with said macro base station. In some embodiments, the first frequency band is a licensed frequency band and the second frequency band is an unlicensed frequency band. In some embodiments, the first protocol is a cellular wireless radio protocol.

In some embodiments, processor 302 is configured to transmit a second discovery signal using the first modem in the first frequency band in accordance with the first communications protocol. In some such embodiments, the second discovery signal includes identification information of said UE device, capability information of said second modem, and QoS requirements of said UE device.

Figure 4:
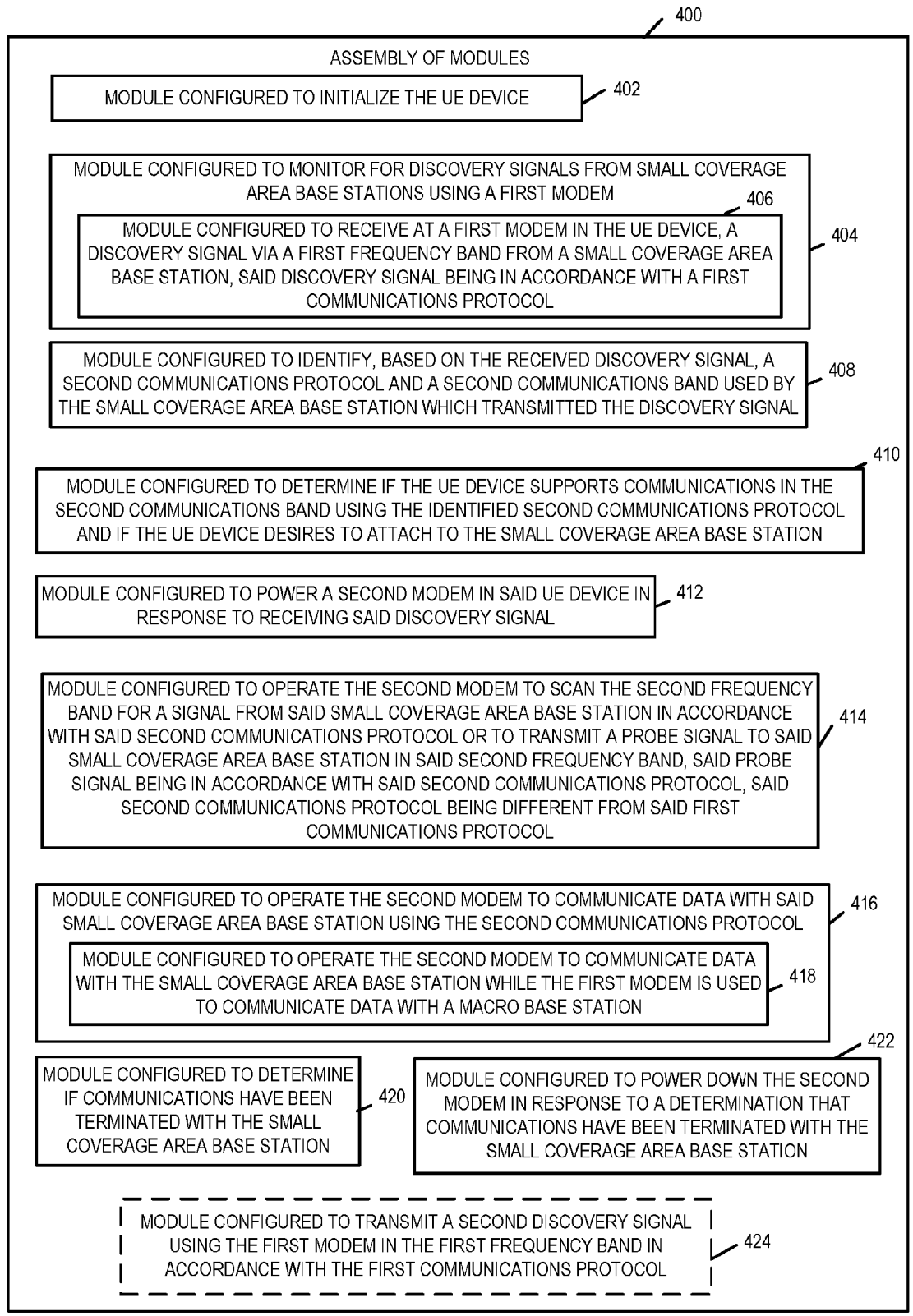
FIG. 4 illustrates an assembly of modules which can be, and sometime is, used in the exemplary user equipment device shown in FIG. 3.

FIG. 4 is an assembly of modules 400 which can, and in some embodiments is, used in the UE device 300 illustrated in FIG. 3. Assembly of modules 400 can be implemented in hardware within the processor 302 of the UE device 300 of FIG. 3, e.g., as individual circuits. The modules in the assembly 400 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. As should be appreciated the level of integration of modules on the processor and/or with some modules being external to the processor may be one of design choice. In some but not necessarily all embodiments some modules are implemented in the processor 302 with the other modules being implemented in the processor and/or external to the processor 302.

Alternatively, rather than being implemented as circuits, all or some of the modules may be implemented in software and stored in the memory 304 of the UE device 300 with the modules controlling operation of the UE device 300 to implement the functions corresponding to the modules when the modules are executed by a processor, e.g., processor 302. In some such embodiments, the assembly of modules 400 is included in routines 311 of memory 304 of the UE device 300 of FIG. 3. In still other embodiments, various modules are implemented as a combination of hardware and software, e.g., with a sensor or another circuit external to the processor providing input to the processor 302 which then under software control operates to perform a portion of a module's function.

While shown in the FIG. 3 embodiment as a single processor, e.g., computer, it should be appreciated that the processor 302 may be implemented as one or more processors, e.g., computers.

When implemented in software the modules include code, which when executed by the processor 302, configure the processor 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the UE device 300 or elements therein such as the processor 302, to perform the functions of the corresponding steps illustrated in the method flow chart 200 of FIG. 2.

The assembly of modules 400 includes a module corresponding to each step of the method shown in FIG. 2. The module in FIG. 4 which performs or controls the processor 302 to perform a corresponding step shown in FIG. 2 is identified with a number beginning with a 4 instead of beginning with 2. For example module 404 corresponds to step 204 and is responsible for performing the operation described with regard to step 204.

Assembly of module 400 includes a module 402 configured to initialize the UE device, a module 404 configured to monitor for discovery signals from small coverage area base stations using a first modem. Module 404 includes a module 406 configured to receive at a first modem in the UE device a discovery signal via a first frequency band from a small coverage area base station, said discovery signal being in accordance with a first communications protocol.

Assembly of modules 400 further includes a module 408 configured to identify, based on the received discovery signal, a second communications protocol and a second communications band used by the small coverage area base station which transmitted the discovery signal, a module 410 configured to determine if the UE device supports communications in the identified second communications band using the identified second communications protocol and if the UE device desires to attach to the small coverage area base station. Assembly of modules 400 further includes a module 412 configured to power a second modem in said UE device in response to receiving said discovery signal, a module 414 configured to operate the second modem to scan the second frequency band for a signal from said small coverage area base station in said second frequency band in accordance with a second communications protocol or to transmit a probe signal to said small coverage area base station in accordance with said second communications protocol, said second communication protocol being different from said first communications protocol. Assembly of modules 400 further includes a module 416 configured to operate the second modem to communicate data with said second small coverage area base station using the second communications protocol. Module 416 includes a module 418 configured to operate the second modem to communicate data with the small coverage area base station while the first modem is used to communicate data with a macro base station.

Assembly of modules 400 further includes a module 420 configured to determine if the communication have been terminated with the small coverage area base station, and a module 422 configured to power down the second modem in response to a determination that communications have been terminated with the small coverage area base station.

In some embodiments, assembly of modules 400 further includes a module 424 configured to transmit a second discovery signal using the first modem in the first frequency band in accordance with the first communications protocol. In some such embodiments, the second discovery signal includes identification information of the UE device, capability of the second modem, and QoS requirements of the UE device.

In some embodiments, the first modem is configured for communication with a macro base station via the first frequency band. In some embodiments, said first frequency band is a licensed frequency band; and said second frequency band is an unlicensed frequency band. In various embodiments, the first protocol is a cellular wireless radio protocol. In various embodiments, the first communications protocol is a time synchronous protocol.

Figure 5A:
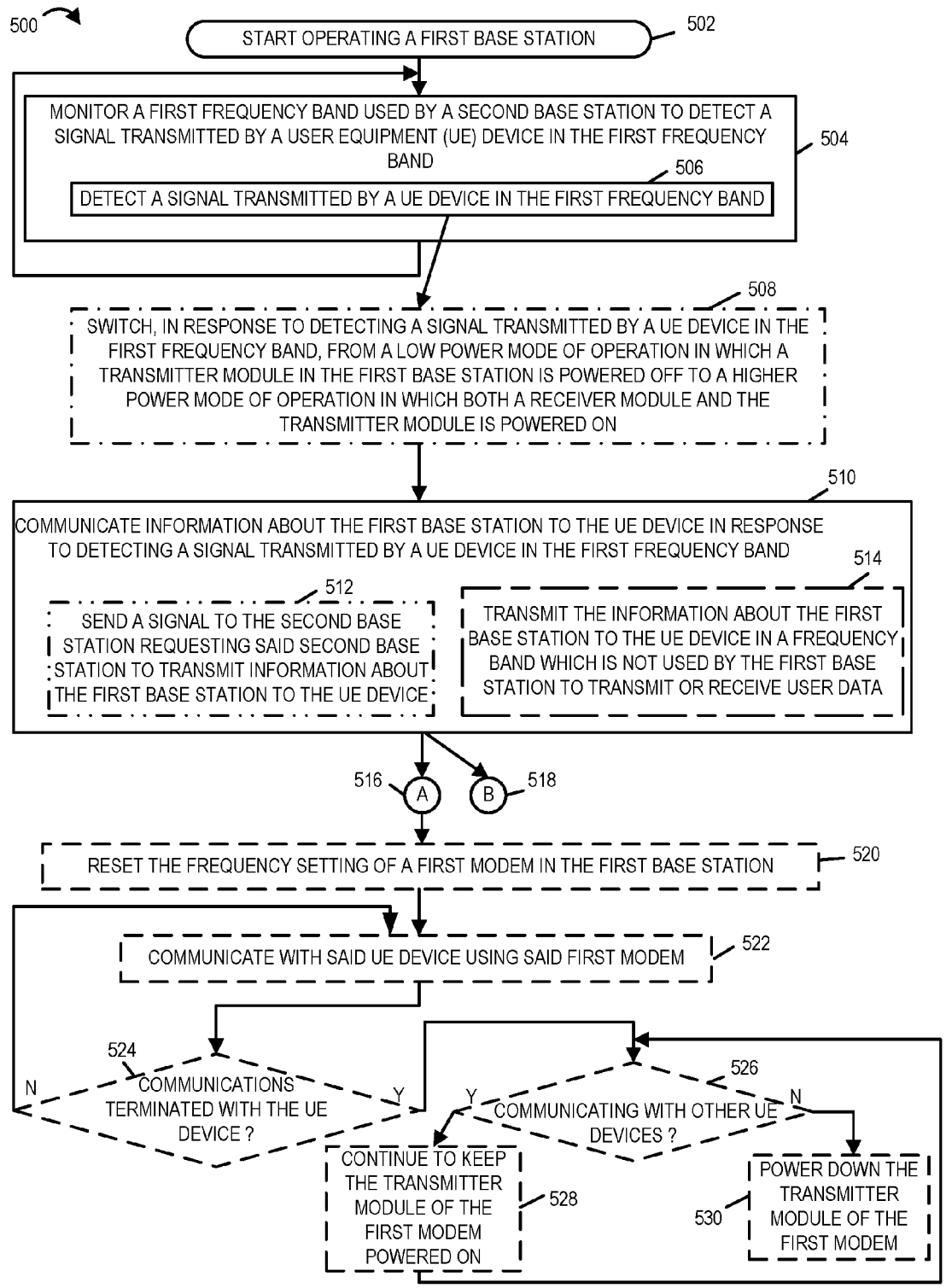
FIG. 5A is a first part of a flowchart of an exemplary method of operating a first base station, e.g., a small coverage area base station, in accordance with various exemplary embodiments.
Figures 5, 5A, 5B:
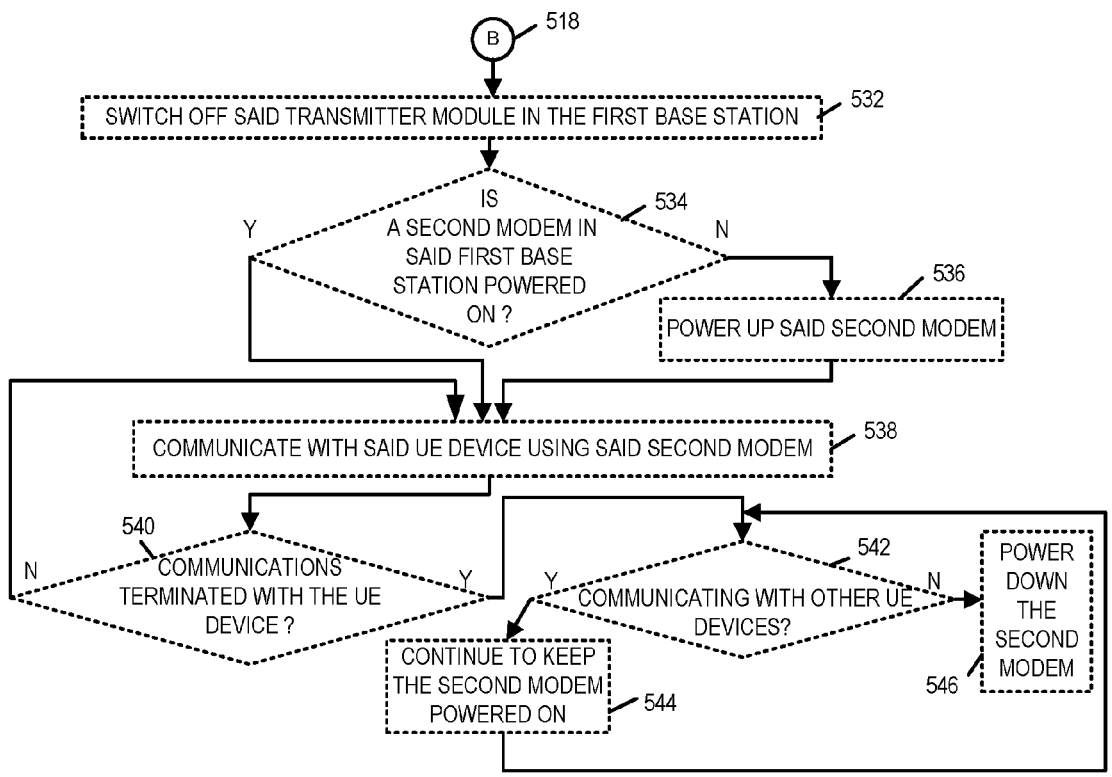
FIG. 5B is a second part of a flowchart of an exemplary method of operating a first base station, e.g., a small coverage area base station, in accordance with various exemplary embodiments.

FIG. 5, comprising the combination of FIG. 5A and FIG. 5B, is a flowchart 500 of an exemplary method of operating a first base in accordance with various embodiments. In various embodiments, the first base station is a small coverage area base station. The first base station is, e.g., one of a femto base station, pico base station, micro base station, WiFi access point and Bluetooth access point. Operation starts in step 502, in which the first base station, e.g., a small coverage area base station, is powered on and initialized. In various embodiments, a part of initialization the first base station powers on a receiver module, e.g., a receiver module in a first modem of the first base station. In some such embodiments, as part of initialization the first base station controls a transmitter module, e.g., a transmitter module in a first modem in the first base station, to be powered off. In some embodiments, as part of initialization, the first base station controls the first base station to be placed in a low power mode of operation. Operation proceeds from step 502 to step 504. In step 504, the first base station monitors a first frequency band used by a second base station to detect a signal transmitted by a UE device in the first frequency band. The signal transmitted by a UE device is, e.g., a discovery signal that includes identification information of the UE device. In some embodiments, the second base station is a macro cell base station in whose cell the first base station is located. In some embodiments, the first frequency band is a frequency band used by the second base station, e.g., macro base station, but which is not used by the first base station to communicate user data, e.g., traffic data signals. Step 504, is performed on an ongoing basis. In some embodiments, the monitoring of step 504 is performed during a low power mode of operation in which the first base station controls a transmitter module, e.g., a transmitter module in a first modem, in the first base station to be powered off.

Step 504, may, and sometimes does, include step 506, in which the first base station detects a signal transmitted by a UE device in the first frequency band. In some embodiments, the first frequency band is a macro frequency band. In some such embodiments, the first frequency band is a macro uplink frequency band.

In some embodiments, operation proceeds from step 506 to step 508. In other embodiments, operation proceeds from step 506 to step 510.

Returning to step 508, in step 508 the first base station switches, in response to detecting a signal transmitted by the UE device in the first frequency band, from a low power mode of operation in which a transmitter module in the first base station is powered off to a higher power mode of operation in which both a receiver module and the transmitter module is powered on. Operation proceeds from step 508 to step 510.

In step 510 the first base station communicates information about the first base station to the UE device in response to detecting a signal transmitted by a UE device in the first frequency band. In some embodiments, the information about the first base station includes first base station identification information. In some embodiments, the information about the first base station including information identifying a communications protocol used by the first base station to communicate information including user data, e.g., traffic data. In some embodiments, the information about the first base station includes information identifying a frequency band used by the first base station to communicate information including user data, e.g., traffic data. In some embodiments, the information about the first base station includes information indicating communications resources, e.g., frequency and/or time slot, which can be used to access the first base station. In some embodiments the information about the first base station includes information about the authorization and authentication such as encryption keys. In some embodiments, the information about the first base station includes information of a second frequency band and a second communications protocol. In some such embodiments, the second frequency band is used by the first base station to transmit or receive user data. In various embodiments, step 510 includes one of step 512 and step 514.

In step 512 the first base station sends a signal to the second base station requesting said second base station to transmit information about the first base station to the UE device. Thus, in some embodiments, information about the first base station is communicated to the UE device via the second base station, e.g., the macro cell base station, in response to a request from the first base station. In some embodiments, the signal to the second base station includes information including an identifier corresponding to said UE device to be transmitted in a unicast message from said second base station, e.g., macro cell base station, to the UE device. In step 514, the first base station transmits the information about the first base station to the UE device in a frequency band which is not used by the first base station to transmit or receive user data. In some embodiments, the frequency band which is not used by the first base station to transmit or receive user data is a downlink frequency band used by the second base station, e.g., the macro cell downlink frequency band. Thus in some embodiments, the first base station, e.g., the small coverage area base station, uses the macro cell downlink frequency band to communicate the information about the first base station, e.g., information such that the UE device can configure itself and communicate with the first base station using the frequency band and/or particular technology modem that the first base station uses for communicating user data, e.g., traffic data. In some other embodiments, the first frequency band is an uplink frequency band used by the second base station.

In some embodiments, operation proceeds from step 510, via connecting node A 516, to step 520. In some other embodiments, operation proceeds from step 510 via connecting node B 518 to step 532.

In some embodiments, e.g., some embodiments in which the first base station is a small coverage area base station which uses the same technology type modem as the macro base station, the exemplary method includes steps 520, 522, 524, 526, 528, and 530. For example, the first base station is an LTE femto base station, and the macro base station, in whose macro cell the first base station is located, is an LTE macro base station, and the femto cell and macro cell use different frequency bands, e.g., with regard to traffic signaling with UE devices.

In some embodiments, e.g., some embodiments in which the first base station is a small coverage area base station which includes two different technology type modems, the exemplary method includes steps 532, 534, 536, 538, 540, 542, 544, and 546. For example the first base station is a WiFi access point located within the coverage area of an LTE macro cell base station, and first base station includes an LTE modem used for communicating discovery signals to UE device and/or detecting signals transmitted by UE device in a first communications band and a 802.11 WiFi modem used for signaling including user data, e.g., traffic data, in a second communications band. In another example the first base station is a Bluetooth access point located within the coverage area of an LTE macro cell base station, and first base station includes an LTE modem used for communicating discovery signals to UE device and/or detecting signals transmitted by UE device in a first communications band and a Bluetooth modem used for signaling including user data, e.g., traffic data, in a second communications band. In still another example the first base station is a femto base station located within the coverage area of an LTE macro cell base station, and first base station includes an LTE modem used for discovery in a first communications band and a CDMA modem used for signaling including user data, e.g., traffic data, in a second communications band.

Returning to step 520, in step 520, the first base station resets the frequency setting of a first modem in the first base station. For example, the first base station, e.g., an LTE femto cell base station, resets the frequency setting of an LTE modem from the frequency setting used by the macro base station for macro communications to a frequency setting used by the first base station for femto cell communications including femto cell traffic signaling. Operation proceeds from step 520 to step 522

In step 522 the first base station communicates with the UE device using the first modem. Operation proceeds from step 522 to step 524. In step 524, the first base station determines if communications with the UE device has been terminated. If communications with the UE device have not been terminated, then operation proceeds from step 524, to step 522 for additional communications with the UE device using the first modem. However, if communications with the UE device have been terminated, e.g., for any of a number of possible reasons, then operation proceeds from step 524 to step 526. Some exemplary reasons for termination include: the UE device moved outside the coverage area of the first base station, channel conditions between the UE device and the first base station deteriorated, the UE device and/or the first base station does not have additional traffic data to communicate, the UE device wishes to conserve remaining battery power, and the first base station is heavily loaded. In step 526, the first base station determines if the first base station is communicating with other UE devices. If the determination of step 526 is that the first base station is communicating with other UE devices, then operation proceeds from step 526 to step 528, in which the first base station continues to keep the transmitter module of the first modem powered on. Operation proceeds from step 528 to the input of step 526. If the determination of step 526 is that the first base station is not communicating with other UE devices, then operation proceeds from step 526 to step 530, in which the first base station powers down the transmitter module of the first modem.

Returning to step 532, in step 532 the first base station switches off the transmitter module in the first base station, e.g., the transmitter module in the first modem of the first base station. Operation proceeds from step 532 to step 534. In step 534 the first base station determines if a second modem in said first base station is powered on. If the determination of step 534 is that the second modem is not powered on, then operation proceeds from step 534 to step 536; otherwise operation proceeds from step 534 to step 538. Returning to step 536, in step 536 the first base station powers up the second modem. Operation proceeds from step 536 to step 538.

In step 538 the first base station communicates with said UE device using said second modem. Operation proceeds from step 538 to step 540. In step 540, the first base station determines if communications with the UE device has been terminated. If communications with the UE device have not been terminated, then operation proceeds from step 540, to step 538 for additional communications with the UE device using the second modem. However, if communications with the UE device have been terminated, e.g., for any of a number of possible reasons, then operation proceeds from step 540 to step 542. Some exemplary reasons for termination include: the UE device moved outside the coverage area of the first base station, channel conditions between the UE device and the first base station deteriorated, the UE device and/or the first base station does not have additional traffic data to communicate, the UE device wishes to conserve remaining battery power, and the first base station is heavily loaded. In step 542, the first base station determines if the first base station is communicating with other UE devices using the second modem. If the determination of step 526 is that the first base station is communicating with other UE devices using the second modem, then operation proceeds from step 542 to step 544, in which the first base station continues to keep the second modem powered on. Operation proceeds from step 544 to the input of step 542. If the determination of step 542 is that the first base station is not communicating with other UE devices using the second modem, then operation proceeds from step 542 to step 546, in which the first base station powers down the second modem.

In some embodiments, step 504 is performed continuously. In some other embodiments, step 506 is performed periodically.

Figure 6:
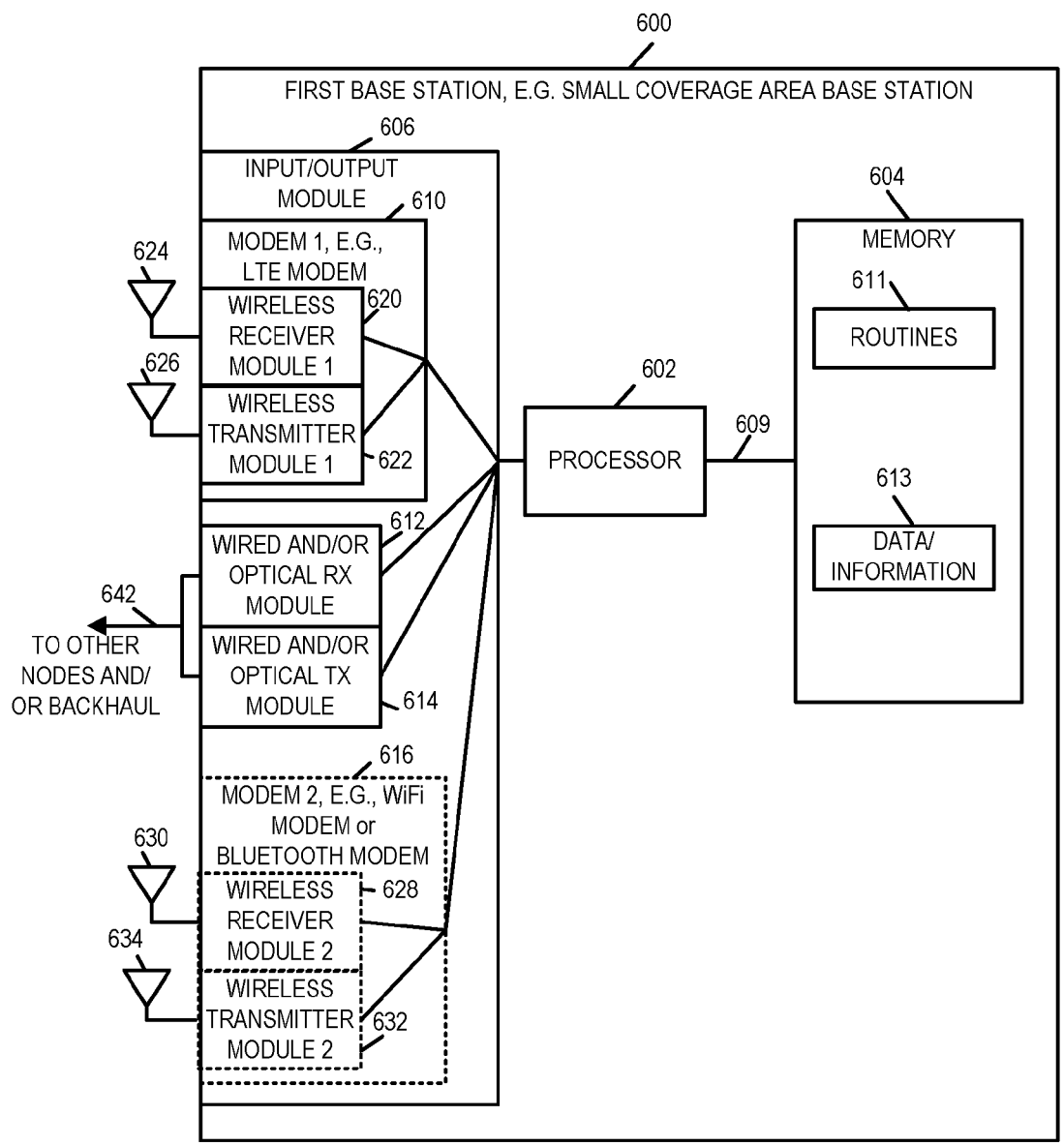
FIG. 6 illustrates an exemplary first base station, e.g., a small coverage area base station, in accordance with various exemplary embodiments.

FIG. 6 is a drawing of an exemplary first base station 600, e.g., a small coverage area base station, in accordance with various exemplary embodiments. In some embodiments, first base station 600, is a small coverage area base station and is one of: a femto base station, a pico base station, a micro base station, a WiFi access point, and a Bluetooth access point. Exemplary first base station 400, is ,e.g., one of the small coverage area base stations (106, 108, 110, 112, 114, 116, 118, 120, 122) of system 100 of FIG. 1. The exemplary first base station 600 may, and sometimes does, implement a method in accordance with flowchart 500 of FIG. 5.

The first base station 600 includes a processor 602 and memory 604 coupled together via a bus 609 over which the various elements (602, 604) may interchange data and information. The first base station 600 further includes an input/output module 606 which may be coupled to processor 602 as shown.

However, in some embodiments, the input/output module 606 is located internal to the processor 602. The input/output module 606 includes a first modem, modem 1 610, e.g., an LTE modem. In some embodiments, the input/output module 606 further includes a second modem, modem 2 616, e.g., one of a 802.11 WiFi modem and a Bluetooth modem. In another example, modem 1 610 is an LTE modem and modem 2 612 is a CDMA modem.

Modem 1 610 includes a wireless receiver module 620 coupled to wireless communications receive antenna 624 and a wireless transmitter module 622 coupled to wireless communications transmit antenna 626. Modem 1 610 supports a first communications protocol, e.g., a cellular wireless radio protocol. The wireless receiver module 620 of modem 1 610 is configured to receive wireless signals and process received wireless signals using the first communications protocol, and the wireless transmitter module 622 is configured to generate and transmit wireless signals using the first communications protocol. In one example, the communications protocol used by modem 1 6120 is an LTE protocol. In some embodiments, modem 1 610 is configured to operate in a first frequency band, e.g., a licensed cellular communications band. In some embodiments, modem 1 610 can be, and sometimes is, configured to operate in different frequency bands at different times, e.g., a macro cellular band during some times and a femto cellular band during other times. In various embodiments, modem 1 406 operates using one or more licensed frequency bands. In some embodiments, the same antenna is used for both input and output wireless communications signaling.

Modem 2 616 includes a wireless receiver module 628 coupled to a wireless communications receive antenna 630 and a wireless transmitter module 632 coupled to a wireless communications transmit antenna 634. In various embodiments modem 2 616 supports a second communications protocol, e.g., an 802.11 communications protocol or a WiFi communications protocol. In another example, the second communications protocol supported by module 2 616 is a CDMA protocol. The wireless receiver module 2 628 of modem 2 616 is configured to receive input over wireless communications links in a second frequency band and the wireless transmitter module 2 632 is configured to transmit output over wireless communications links in the second frequency band. In some embodiments the second frequency band is an unlicensed frequency band. In some other embodiments the second frequency band is an licensed frequency band.

The input/output module 606 further includes a wired and/or optical receiver module 612 for receiving input over a wired and/or optical link and a wired and/or optical transmitter module 614 for transmitting output signals over a wired and/or optical link. The wired and/or optical receiver module 612 and the wired and/or optical transmitter module 614 are coupled to other nodes and/or to a backhaul, and/or to the Internet via link 642. Memory 604 includes routines 611, and data/information 613.

In various embodiments, processor 602 is configured to: monitor a first frequency band used by a second base station to detect a signal transmitted by a UE device in said first frequency band; and communicate information about said first base station to said UE device in response to said monitoring detecting a signal transmitted by a UE device in said first frequency band. In some such embodiments, first frequency band is a frequency band used by said second base station but which is not used by said first base station to communicate user data. In various embodiments, processor 602 is configured to detect a signal transmitted by the UE device in the first frequency band.

In some embodiments, said information about said first base station includes first base station identification information. In some such embodiments, said information about said first base station further includes information indicating communications resources, e.g., a frequency and/or time slot, which can be used to access said first base station. In some embodiments, the information about the first base station includes information identifying a particular communications technology, e.g., LTE, WiFi, etc. In some embodiments, the information about the first base station [123587] 24 includes information identifying a particular communications protocol. In some embodiments, the information about the first base station includes information identifying a communications band, e.g., a second communications band, used for signaling between the first base station an UE devices, said signaling including user data, e.g. traffic data signals. In some embodiments, the information about the first base station includes information about the authorization and authentication such as encryption keys. In some embodiments, the information about the first base station includes information of a second frequency band and a second communications protocol. In some such embodiments, the second frequency band is used by the first base station to transmit or receive user data.

In various embodiments, processor 602 is configured to send a signal to said second base station to cause said second base station to transmit said information to said UE device, as part of being configured to communicating information about said first base station to said UE device. In some such embodiments, said signal to said second base station includes a information including a UE device identifier corresponding to said UE device to be transmitted via a unicast transmission from saidsecond base station to said UE device.

In various embodiments, processor 602 is configured to transmit said information to said UE device in a frequency band which is not used by said first base station to transmit or receive user data, as part of being configured to communicate information about said first base station to said UE device. In some such embodiments, said frequency band is a frequency band used by the second base station. In some such embodiments, said first frequency band is a downlink frequency band used by said second base station.

In various embodiments, processor 602 is configured to: perform said monitoring during a low power mode of operation in which said first (femto) base station controls a transmitter module in said first base station to be powered off; and processor 602 is configured to switch, in response to detecting a signal transmitted by said UE device in said first frequency band from said low power mode of operation to a higher power mode of operation in which said first base station powers both a receiver module and a transmitter module.

In some embodiments, the first base station is a WiFi access point. In some other embodiments, the first base station is a Bluetooth access point.

In some other embodiments, the first base station is one of a femto base station, pico base station and micro base station. In some such embodiments, the first base station, e.g., a femto cell base station, uses the same communications protocol as the second base station, e.g., macro cell base station, in whose cell it is located, e.g., both macro and femto cells use LTE but use different communications bands for signals including user data, e.g., traffic data signals. In some other such embodiments, the first base station, e.g., a femto cell base station, uses a different communications protocol as the second base station, e.g., macro cell base station, in whose cell it is located, e.g., the femto cell uses CDMA and the macro cell uses LTE.

In some embodiments, processor 602 is configured to reset the frequency setting of a first modem in the first base station, e.g., so that first base station can communicate with the UE device in a second frequency band which is different than said first frequency band using the first modem. In some embodiments, processor 602 is configured to communicate with the UE device using the first modem in the second communications band. In some embodiments, processor 602 is configured to determine if communications with the UE device has been terminated. In some such embodiments, processor 602 is configured to perform additional communications with the UE device via the first modem using the second communications band, if the determination is that communications with the UE device have not been terminated. In various embodiments, processor 602 is configured to determine if the first base station is communicating with other UE devices using the first modem and the second communications band. In some embodiments, processor 602 is configured to keep the transmitter module of the first modem powered on if the determination is that the first base station is communicating with at least one UE device. In some embodiments, processor 602 is configured to power down the transmitter module of the first modem, if it is determined that the first base station is no longer communicating with any UE devices via the first modem in the second communications band.

In some embodiments, processor 602 is configured to switches off the transmitter module in the first base station, e.g., the transmitter module in the first modem of the first base station, e.g., as the first base station intends to communicate with the UE device using a second modem in the first base station. In some embodiments, processor 602 is configured to determine if a second modem in said first base station is powered on. In some embodiments, processor 602 is configured to powers up the second modem, when it is determined that the second modem is not powered on and the first base station intends to communicate with the UE device and said communications include communicating user data, e.g., traffic data.

In various embodiments, processor 602 is configured to communicates with said UE device using said second modem, e.g., using a second communications band which is different from the first communications band. In some embodiments, processor 602 is configured to determine if communications with the UE device has been terminated. In some such embodiments, processor 602 is configured to perform additional communications with the UE device using the second modem if it is determined that communications have not been terminated. In some embodiments, processor 602 is configured to determine if the first base station is communicating with other UE devices using the second modem, if it has been determined that communications have been terminated between the first base station and the UE device. In some embodiments, processor 602 is configured to keep the second modem powered on, when it is determined that at least one UE device is still communicating with the first base station using the second modem. In some embodiments, processor 602 is configured to power down the second modem, when it is determined that no UE devices are still communicating with the first base station using the second modem.

Figure 7A:
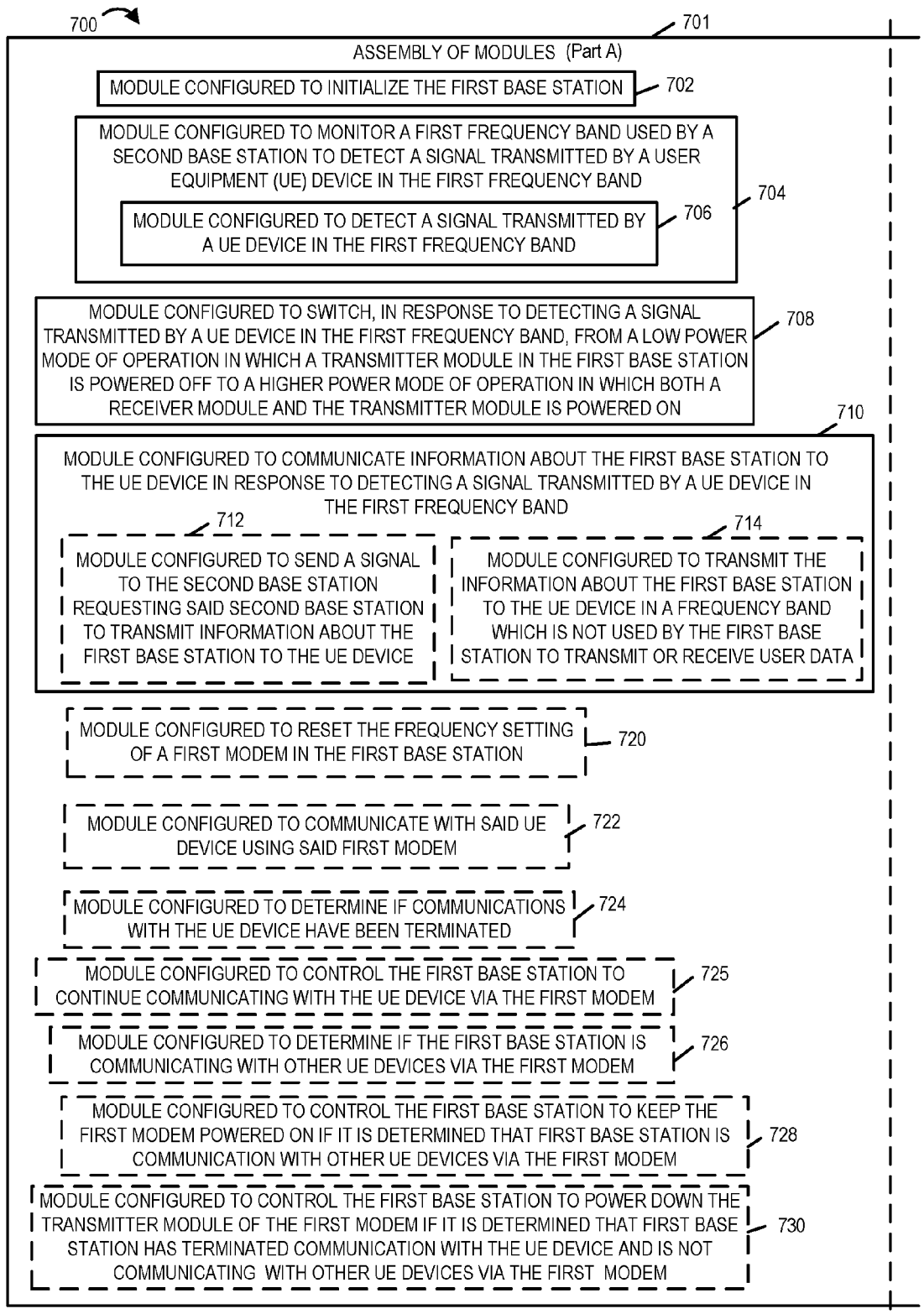
FIG. 7A illustrates a first portion of an assembly of modules which can be, and sometimes is, used in the exemplary base station of FIG. 6.
Figures 7, 7B:
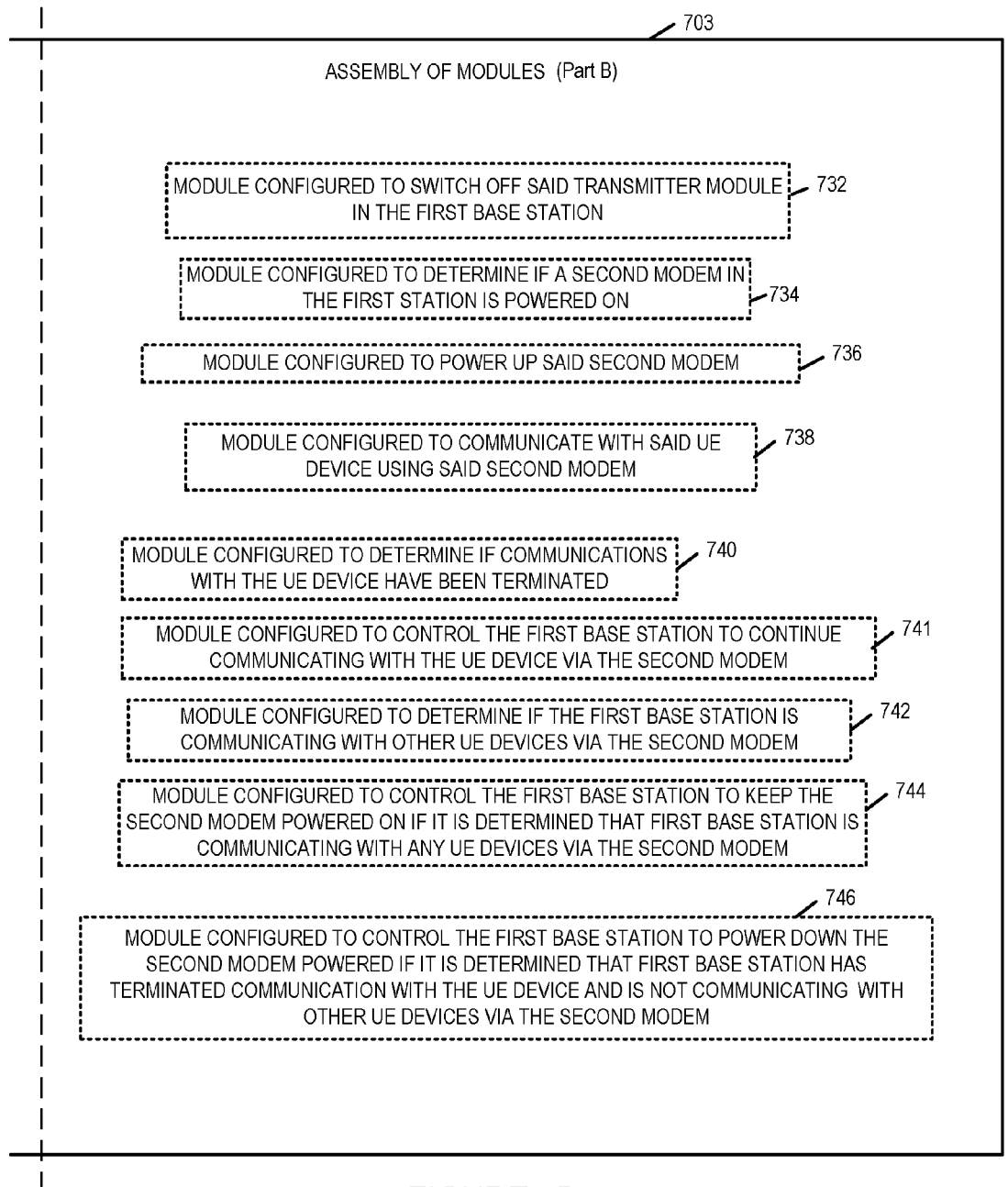
FIG. 7B illustrates a second portion of an assembly of modules which can be, and sometimes is, used in the exemplary base station of FIG. 6.

FIG. 7, comprising the combination of FIG. 7A and FIG. 7B, is an assembly of modules 700 which can, and in some embodiments is, used in the first base station 600 illustrated in FIG. 6. Assembly of modules 700 can be implemented in hardware within the processor 602 of the base station 600 of FIG. 6, e.g., as individual circuits. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and/or with some modules being external to the processor may be one of design choice. Alternatively, rather than being implemented as circuits, all or some of the modules may be implemented in software and stored in the memory 604 of the first base station 600 with the modules controlling operation of the base station 600 to implement the functions corresponding to the modules when the modules are executed by a processor, e.g., processor 602. In some such embodiments, the assembly of modules 600 is included in routines 611 of memory 604 of first base station 600 of FIG. 6. In still other embodiments, various modules are implemented as a combination of hardware and software, e.g., with a sensor or another circuit external to the processor providing input to the processor 602 which then under software control operates to perform a portion of a module's function.

While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the first base station 600 or elements therein such as the processor 602, to perform the functions of the corresponding steps illustrated in the method flowchart 500 of FIG. 5.

The assembly of modules 700 includes a module corresponding to each step of the method shown in FIG. 5. The module in FIG. 7 which performs or controls the processor 602 to perform a corresponding step shown in FIG. 5 is identified with a number beginning with a 7 instead of beginning with 5. For example module 704 corresponds to step 504 and is responsible for performing the operation described with regard to step 504.

As illustrated in FIG. 7, the assembly of modules 700, comprising the combination of Part A 701 and Part B 703, includes a module 702 configured to initialize the first base station, a module 704 configured to monitor a first frequency band used by a second base station to detect a signal transmitted by a user equipment (UE) device in the first frequency band. Module 704 includes a module configured to detect a signal transmitted by a UE device in the first frequency band. Assembly of modules 700 further includes a module 708 configured to switch, in response to detecting a signal transmitted by a UE device in the first frequency band, from a low power mode of operation in which a transmitter module in the first base station is powered off to a higher power mode of operation in which both a receiver module and a transmitter module is powered on, and a module 710 configured to communicate information about the first base station to the UE device in response to detecting a signal transmitted by a UE device in the first frequency band. In some embodiments, module 710 includes a module 712 configured to send a signal to the second base station requesting said second base station to transmit information about the first base station to the UE device or a module 714 configured to transmit the information about the first base station to the UE device in a frequency band which is not used by the first base station to transmit or receive user data.

In various embodiments, the first communications band, e.g., a macro cellular communications band is used by the first base station to communicate information about the first base station. The communicated discovery information in some embodiments, includes information identifying a second communications band, e.g., a femto cell communications band to be used for communicating user data, e.g., traffic data, with a UE device.

In some embodiments, the first frequency band is macro frequency band used by the second base station, e.g., a macro base station. In some such embodiments, the first frequency band is a macro uplink frequency band. In some embodiments, the first frequency band is a frequency band used by said second base station but which is not used by said first base station to communicate user data.

In some embodiments, said information about said first base station, communicated by module 710, includes first base station identification information. In some such embodiments, said information about said first base station further includes information indicating communications resources, e.g., a frequency and/or time slot, which can be used to access said first base station. In some embodiments the information about the first base station includes information about the authorization and authentication such as encryption keys. In some embodiments, the information about the first base station includes information of a second frequency band and a second communications protocol. In some such embodiments, the second frequency band is used by the first base station to transmit or receive user data. In some embodiments, said signal to said second base station, sent by module 512, includes information including a UE device identifier corresponding to said UE device to be transmitted via a unicast transmission from said second base station to said UE device.

In some embodiments, said first frequency band is a downlink frequency band used by said second base station. In some other embodiments, the first frequency band is an uplink frequency band used by said second base station.

In some embodiments, module 704 perform monitoring during a low power mode of operation in which said first base station controls a transmitter module in said first base station to be powered off.

In various embodiments, said first base station is a small coverage area base station. In some embodiments, said first base station, is a WiFi access point. In some embodiments, said first base station is a Bluetooth access point. In some embodiments, said first base station is one of a femto base station, pico base station, and micro base station.

In some embodiments, e.g., some embodiments in which first base station 600 uses the modem 1 610 to communicate in a macro cell communications band and a small coverage area, e.g., femto cell communications band, at different times, assembly of modules 700 includes one or more or all of modules: 720, 722, 724, 725, 726, 728, and 730. Thus, in some embodiments, assembly of modules 700 includes a module 720 configured to reset the frequency setting of a first modem in the first base station, e.g., from a first frequency band to a second frequency band, a module 722 configured to communicate with said UE device using the first modem, e.g. using the second frequency band, a module 724 configured to determine if communications with the UE device have been terminated, a module 725 configured to control the first base station to continue communicating with the UE device via the first modem when it is determined that communication with the UE device have not been terminated, a module 726 configured to determine if the first base station is communicating with other UE devices via the first modem, a module 728 configured to control the first base station to keep the first modem powered on if it is determined that the first base station is communicating with other UE devices via the first modem, and a module 730 configured to control the first base station to power down the transmitter module of the first modem if it is determined that the first base station has terminated communication with the UE device and is not communicating with other UE devices via the first modem.

In various embodiments, the first communications band, e.g., a macro cellular communications band is used by the first base station to communicate information about the first base station. The communicated discovery information in some embodiments, includes information identifying a second communications band, e.g., a femto cell communications band to be used for communicating user data, e.g., traffic data, with a UE device.

In some embodiments, e.g., some embodiments in which first base station 600 uses modem 1 610, e.g., an LTE modem and modem 2 616, e.g., WiFi modem or Bluetooth modem or CDMA modem, assembly of modules 700 includes one or more or all of modules: 732, 734, 736, 738, 740, 741, 742, 744 and 746. Thus, in some embodiments, assembly of modules 700 includes a module 732 configured to switch off said transmitter module in the first base station, e.g. the transmitter module in the first modem, a module 734 configured to determine if the a second modem in the first base station is powered on, a module 736 configured to power up a second modem in the first base station, e.g. to support communication between the first base station and the UE device, said communications including user data signals, e.g., traffic data signals, and a module 738 configured to communicate with said UE device using the second modem, a module 740 configured to determine if communications with the UE device have been terminated, a module 741 configured to control the first base station to continue communicating with UE device via the second modem when it is determined that communications with the UE device have not been terminated, a module 742 configured to determine if the first base station is communicating with other UE devices via the second modem, a module 744 configured to control the first base station to keep the second modem powered on if it is determined that the first base station is communicating with any UE devices via the second modem, and a module 746 configured to control the first base station to power down the second module if it is determined that the first base station has terminated communication with the UE device and is not communicating with other UE devices via the second modem.

Figure 8:
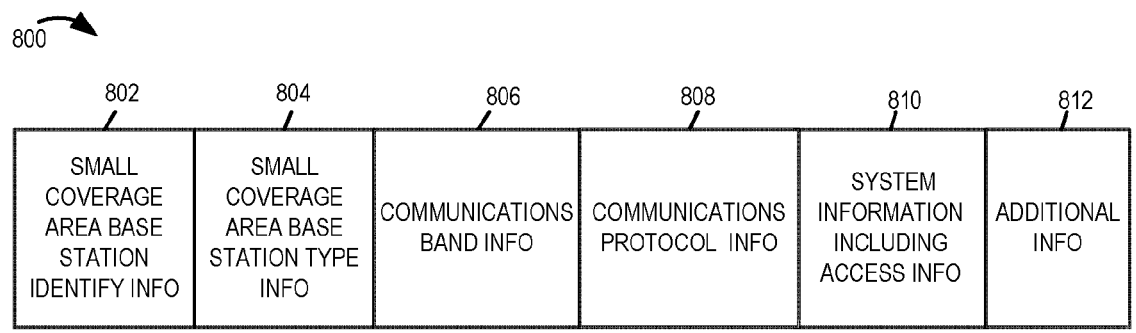
FIG. 8 illustrates an exemplary small coverage area base station transmitted discovery signal in accordance with various embodiments.

FIG. 8 illustrates an exemplary small coverage area base station transmitted discovery signal 800 in accordance with various embodiments. Exemplary signal 800 is, e.g., a discovery signal which is received by the first modem of a UE device in step 206 of flowchart 200 of FIG. 2. In some embodiments, discovery signal 800 is a message with multiple fields communicating different information in the different fields. Exemplary discovery signal 800 includes small coverage area base station identity information 802, e.g., a small coverage base station identifier such as a SSID of an WiFi AP or a cell ID of a femto cell, and small coverage area base station type information 804, e.g., information identifying the type of the small coverage area base station as one of: a femto base station, pico base station, a micro base station, a WiFi AP, or a Bluetooth AP, communications band information 806, e.g., information identifying a band or bands used by the small coverage area base station, e.g., a WiFi band, and/or carrier information corresponding to the small coverage area base station, e.g., a femto cell carrier. Exemplary discovery signal 800 further includes communications protocol information 808, e.g., information identifying a protocol to be used by the small coverage area base station for communications in the communications band identified by information 806, e.g., an LTE protocol, an 802.11 protocol or a Bluetooth protocol. Exemplary signal 800 further includes system information 810 including access information. System information 810 includes, e.g., any of the following: key information, information identifying air link resource structure including particular air link resources used for accessing the small coverage area base station, information communicating system parameters, e.g., master information block (MIB) and system information block (SIB) information. Exemplary signal 800 further includes additional information 812.

In another example, discovery signal 800 is transmitted in step 514 of flowchart 500 by the first base station, which is a small coverage area base station.

Figure 9:
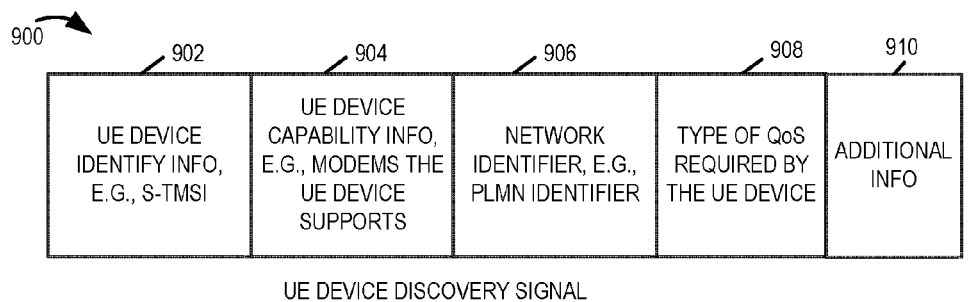
FIG. 9 illustrates an exemplary UE device discovery signal in accordance with various embodiments.

FIG. 9 illustrates an exemplary UE device discovery signal 900 in accordance with various embodiments. Exemplary discovery signal 900 is, e.g., the signal which is detected in step 506 of flowchart 500 of FIG. 5 by the first base station, e.g., a small coverage area base station. In some embodiments, discovery signal 900 is a message with multiple fields communicating different information in the different fields. Exemplary discovery signal 900 includes UE device identify information 902, e.g., a shortened temporary mobile subscriber ID (S-TMSI), UE device capability information 904, e.g., information identifying the modems that the UE device supports, e.g., information identifying that the UE device includes modems for Long Term Evolution (LTE), WiFi and Bluetooth, a network identifier 906, e.g., a public land mobile network (PLMN) identifier, and information identifying a type or level of Quality of Service (QoS) required by the UE device 908. Exemplary signal 900 further includes additional information 910.

Figure 10:
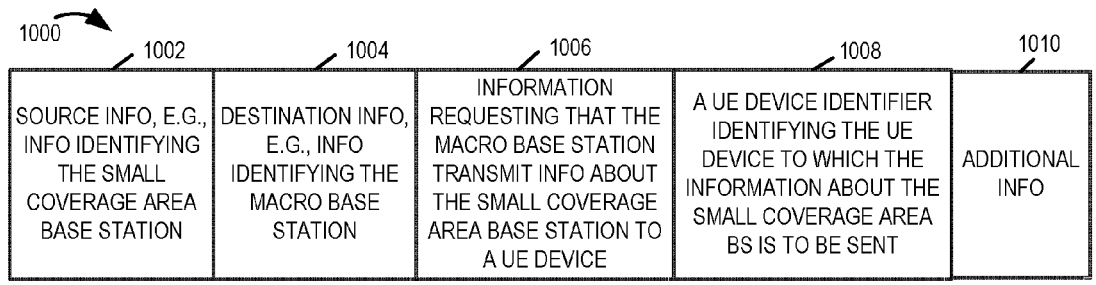
FIG. 10 illustrates an exemplary request signal from a small coverage area base station to a macro base station in accordance with various embodiments.

FIG. 10 illustrates an exemplary request signal 1000 from a small coverage area base station to a macro base station in accordance with various embodiments. Exemplary request signal 1000 is, e.g., the signal transmitted to the second base station, e.g., a macro base station, in step 512 of flowchart 500 of FIG. 5 by the first base station, e.g., a small coverage area base station. In some embodiments, request signal 1000 is a message with multiple fields communicating different information in the different fields. Exemplary request signal 1000 includes source information 1002, e.g., information identifying the small coverage area base which transmitted signal 1000, destination information 1004, e.g., information identifying the macro base station to which the signal is directed, information 1006 requesting that the macro base station transmit information about the small coverage area base station to a UE device, and a UE identifier 1008 identifying the particular UE device to which the information about the small coverage area base station is to be sent. Exemplary signal 1000 further includes additional information 1012.

Figure 11:
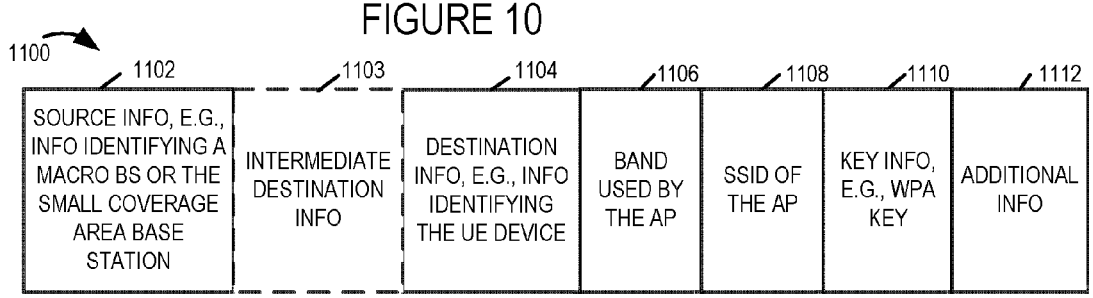
FIG. 11 illustrates an exemplary small coverage area base station information signal to a UE device including information about the small coverage area base station, e.g., a WiFi AP, in accordance with an exemplary embodiment.

FIG. 11 illustrates an exemplary small coverage area base station information signal 1100 to a UE device including information about the small coverage area base station, e.g., a WiF AP, in accordance with an exemplary embodiment. Exemplary signal 1100 includes source information 1102, e.g., information identifying a macro base station or the small coverage area base station which is transmitting signal 1102, destination information 1104, e.g., information identifying the UE device to which the communicated small coverage area base station information is to be delivered, information communicating a band used by the access point 1106, e.g., information identifying a WiFi band, information communicating the SSID of the AP 1 108, and key information 1110, e.g., a WiFi Protected Access (WPA) key. Exemplary signal 1100 further includes additional information 1112 In some embodiments, e.g., some embodiments in which the small coverage area base station transmits signal 1100, signal 1100 includes intermediate destination information 1103 identifying an intermediate node via which information about the small coverage area base station is forwarded, e.g., information identifying the macro base station in which the small coverage area base station is located. In one exemplary embodiment, signal 1100 is the signal generated and transmitted by a macro base station in response to a received request signal 1000, which was transmitted by the small coverage area base station in step 512 of flowchart 500 of FIG. 5. In another exemplary embodiment, signal 1110 is the signal which is generated by the small coverage area base station and transmitted in step 514 of flowchart 500 of FIG. 5.

Figure 12:
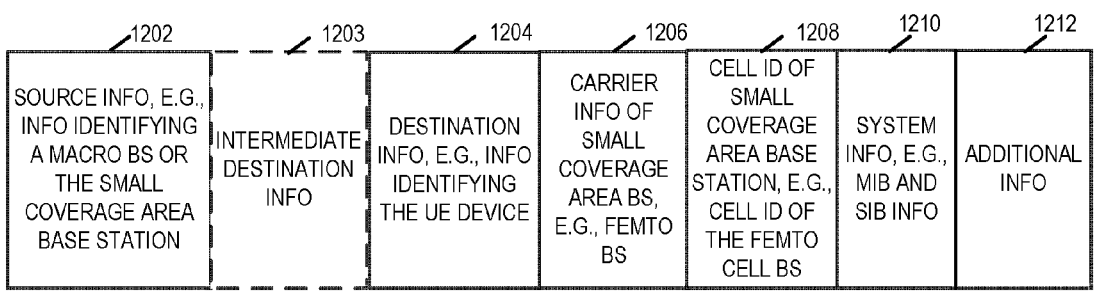
FIG. 12 illustrates an exemplary small coverage area base station information signal to a UE device including information about the small coverage area base station, e.g., a femto BS, in accordance with an exemplary embodiment.

FIG. 12 illustrates an exemplary small coverage area base station information signal 1200 to a UE device including information about the small coverage area base station, e.g., a femto BS, in accordance with an exemplary embodiment. Exemplary signal 1200 includes source information 1202, e.g., information identifying a macro base station or the small coverage area base station which is transmitting signal 1200, destination information 1204, e.g., information identifying the UE device to which the communicated small coverage area base station information is to be delivered, information 1206 communicating carrier information of the small coverage area base station, e.g., carrier information of the femto base station, information 1208 communicating a cell ID of the small coverage area base station, e.g., a cell ID of the femto BS, and system information 1210, e.g., MIB and SIB information corresponding to the small coverage area BS. In some embodiments, e.g., some embodiments in which the small coverage area base station transmits signal 1200, signal 1200 includes intermediate destination information 1203 identifying an intermediate node via which information about the small coverage area base station is forwarded, e.g., information identifying the macro base station in which the small coverage area base station is located. In one exemplary embodiment, signal 1200 is the signal generated and transmitted by a macro base station in response to a received request signal 1000, which was transmitted by the small coverage area base station in step 512 of flowchart 500 of FIG. 5. In another exemplary embodiment, signal 1210 is the signal which is generated by the small coverage area base station and transmitted in step 514 of flowchart 500 of FIG. 5.

Figure 13:
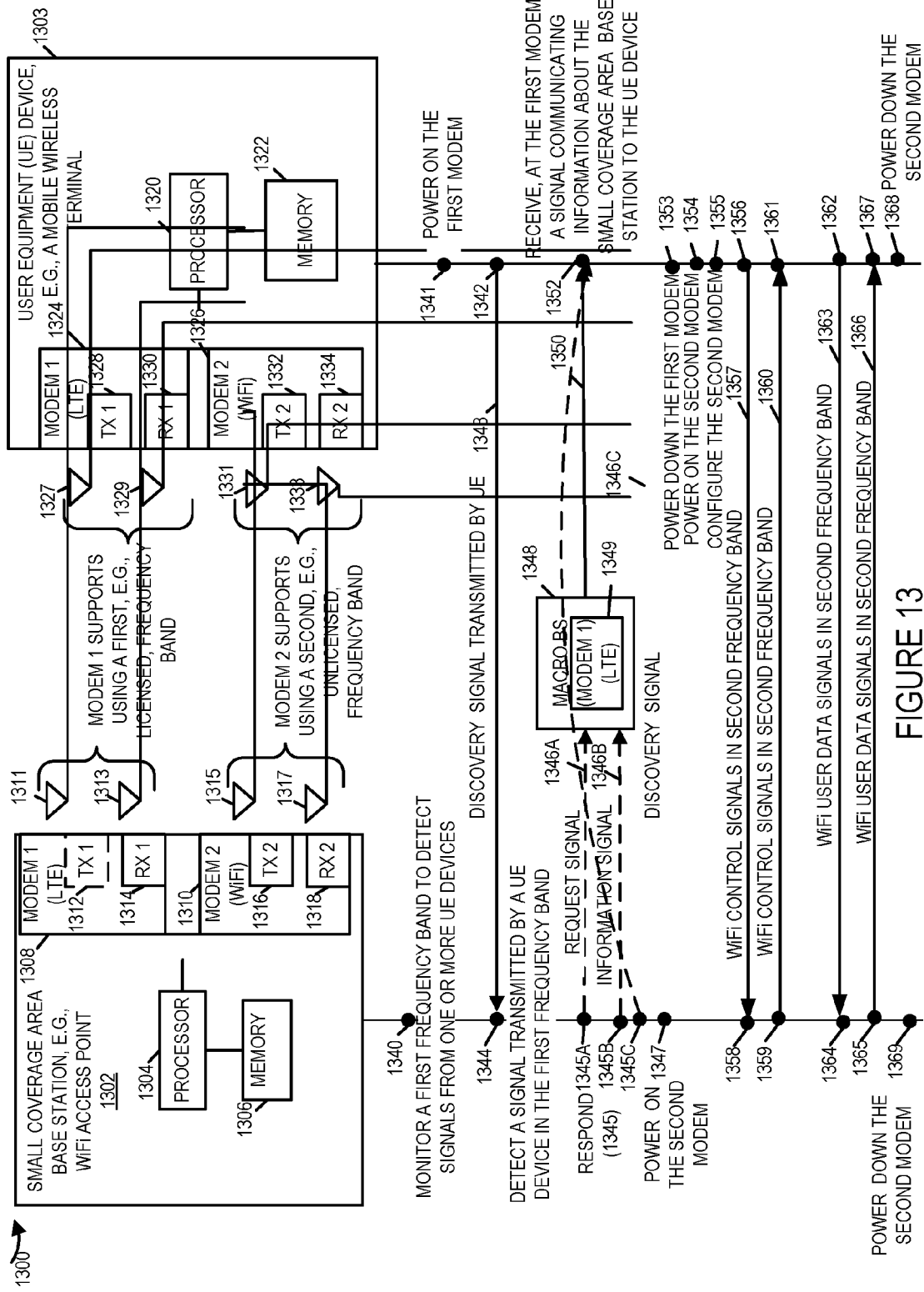
FIG. 13 illustrates an example of operating a small coverage area base station, e.g., a WiFi access point, in accordance with an exemplary embodiment.

Drawing 1300 of FIG. 13 illustrates an example of operating a small coverage area base station 1302, in accordance with an exemplary embodiment. Exemplary small coverage area base station 1302 is, e.g., a first base station implementing a method in accordance with flowchart 500 of FIG. 5 and/or implemented in accordance with first base station 700 of FIG. 7. An exemplary wireless communications system includes macro cell base station 1348, small coverage area base station 1302, e.g., a WiFi access point, which is located within the macro cell corresponding to macro BS 1348, and a user equipment (UE) device 1303, e.g., a mobile wireless terminal such as a smartphone. Small coverage area base station 1302 includes a processor 1304, memory 1306, a first modem, modem 1 1308 which is an LTE modem, and a second modem, modem 2 1310, which is a WiFi modem. The modems (1308, and 1310 are coupled to the processor 1304. Modem 1 1308 includes a transmitter module, TX 1 1312 coupled to transmit antenna 1311 for transmitting LTE signals in a first frequency band, e.g., a licensed frequency band. Modem 1 1308 includes a receiver module, RX 1 1314 coupled to receive antenna 1313 for receiving LTE signals in the first frequency band. Modem 2 1310 includes a transmitter module, TX 2 1316 coupled to transmit antenna 1315 for transmitting WiFi signals in a second frequency band, e.g., an unlicensed frequency band. Modem 2 1310 includes a receiver module, RX 2 1318 coupled to receive antenna 1317 for receiving WiFi signals in the second frequency band.

UE device 1303 includes a processor 1320, memory 1322, a first modem, modem 1 1324 which is an LTE modem, and a second modem, modem 2 1326, which is a WiFi modem. The modems (1324 and 1326) are coupled to the processor 1320. Modem 1 1324 includes a transmitter module, TX 1 1328 coupled to transmit antenna 1327 for transmitting LTE signals in a first frequency band, e.g., a licensed frequency band. Modem 1 1324 includes a receiver module, RX 1 1330 coupled to receive antenna 1329 for receiving LTE signals in the first frequency band. Modem 2 1326 includes a transmitter module, TX 2 1332 coupled to transmit antenna 1331 for transmitting WiFi signals in a second frequency band, e.g., an unlicensed frequency band. Modem 2 1326 includes a receiver module, RX 2 1334 coupled to receive antenna 1333 for receiving WiFi signals in the second frequency band.

Macro base station 1348 includes an LTE modem 1349 for transmitting and receiving wireless LTE signals in the first frequency band. The macro base station 1348 is also coupled to other network nodes, a backhaul network, and/or the Internet. In some embodiments, the small coverage area base station 1302 is coupled to other network nodes, a backhaul network, and/or the Internet.

In step 1340, the small coverage area BS 1302 monitors, on an ongoing basis, the first frequency band to detect signals from one or more UE devices, e.g., monitors particular resources designated to be used to convey discovery signals in the first frequency band. In step 1341, the first UE device powers on the first mode 1324. In step 1342, the UE device generates and transmits discovery signal 1343 into the first frequency band. The discovery signal is, e.g., in accordance with exemplary discovery signal 900. In step 1344, the small coverage area BS 1302 detects the discovery signal 1343. In response to detecting the discovery signal, processing the information communicated in the discovery signal, and determining that the small coverage area BS 1302 can support communications with UE device 1303, since UE device 1303 includes a WiFi modem, the small coverage area BS 1302 responds in step 1345 by communicates information about the small coverage area base station 1302 to the UE device, with the information being communicated to the UE device 1303 in the first communications band.

In one embodiment, in sub-step 1345A, the small coverage area base station 1302 generates and transmits request signal 1346A to macro base station 1348, requesting macro base station 1348 to transmit information about the small coverage area base station to UE device 1303. In one example, request signal 1346A, is in accordance with request signal 1000 of FIG. 10. In another embodiment, in sub-step 1345B, the small coverage area base station 1302 generates and transmits information signal 1346B to macro base station 1348, wherein signal 1346B including information about the small coverage area base station to be communicated to UE device 1303. In one example, information signal 1346B, is in accordance with information signal 1100 of FIG. 11. In some embodiments, signal 1346A or 1346B is communicated wirelessly over the first frequency band between small coverage area BS 1302 and macro BS 1303. In some embodiments, signal 1346A or 1346B is communicated via a backhaul between small coverage area BS 1302 and macro BS 1303. Macro base station 1350 receives request signal 1346A or information signal 1346 B. If request signal 1346A is received, macro BS 1348 retrieves information about small coverage area BS 1302 from its internal memory, e.g., via a look-up table, or externally from information stored on another network node, and macro BS 1348 generates information signal 1350 including information about the small coverage area base station which allows UE 1303 to attach to small coverage area BS 1303. Then macro BS 1348 transmits information signal 1350 to UE device 1303 in the first frequency band using LTE signaling protocol. If information signal 1346B was received by macro BS 1348, macro BS generates signal 1350 which includes information communicated in signal 1346B, and transmits signal 1350 to UE device 1303 in the first frequency band using LTE signaling protocol. In various embodiments, signal 1350 is in accordance with 1100 of FIG. 11. UE device 1303 receives information signal 1350 at first modem 1324 and recovers the information about the small coverage area base station which allows it to access the small coverage area base station.

In one embodiment, in sub-step 1345C the small coverage area BS 1302 generates and transmits discovery signal to UE device 1302 in the first frequency band using LTE communications protocol, e.g., in a discovery resource, to communicate information about the small coverage area BS 1302 to UE device 1303. In one embodiment discovery signal 1346C is in accordance with discovery signal 800 of FIG. 8. UE device 1303 receives signal 1346C and recovers the information communicated.

Following transmission of signal 1346A or signal 1346B or signal 1346C, the small coverage area BS 1302, in step 1347, powers on the second modem. In step 1353, following recovery of information from signal 1352, UE device 1303 powers down modem 1 1324 in step 1353 and powers on modem 2 1326 in step 1354. In step 1355, UE device 1303 configures the second modem in accordance with the information recovered from signal 1350.

The UE device 1303 accesses the small coverage area base station 1302, via WiFi control signaling in the second communications band and attaches to the small coverage area base station 1302. Step 1356 indicates that WiFi control signals 1357 are transmitted from TX 2 1332 of modem 2 1326 in the second frequency band. Step 1358 indicates that WiFi control signals 1357 are received by RX 2 1318 of modem 2 1310 in the small coverage area BS 1302. Step 1359 indicates that WiFi control signals 1360 are transmitted from TX 2 1316 of modem 2 1310 in the second frequency band. Step 1361 indicates that WiFi control signals 1360 are received by RX 2 1334 of modem 2 1326 in UE device 1303.

Step 1362 indicates that WiFi user data signals 1363, e.g., traffic signals, are transmitted from TX 2 1332 of modem 2 1326 in the second frequency band. Step 1364 indicates that WiFi user data signals 1363 are received by RX 2 1318 of modem 2 1310 in the small coverage area BS 1302. Step 1365 indicates that WiFi user data signals, e.g., traffic signals, 1366 are transmitted from TX 2 1316 of modem 2 1310 in the second frequency band. Step 1367 indicates that WiFi user data signals 1366 are received by RX 2 1334 of modem 2 1326 in UE device 1303.

At some point communications is terminated between the small coverage area BS 1302 and UE device 1303, e.g., for any number of reasons including, e.g., a decision to terminate by UE device 1303, a decision to terminate by small coverage area BS 1302, or a loss of communications because of poor channel conditions. In response to the termination of communications, UE device 1303, in step 1368 powers down the second modem 1326. In response to the termination of communications, in step 1369, the small coverage area base station 1302 powers down the second modem 1310 provided there are no other UE devices currently attached to the small coverage area base station.

In various embodiments, if there are no UE devices attached to the small coverage area BS, the small coverage area base station controls modem 2 1310 to be powered down. In some embodiments, small coverage area BS 1302 controls TX 1 module 1312 of modem 1 1308 to be powered down when not being operated to communicate information in response to a detected UE device. In some embodiments, small coverage area base station 1308 powers up receiver module 1314 of modem 1 during predetermined discovery time intervals in accordance with a schedule, to facilitate discovery of UE devices.

Figure 14:
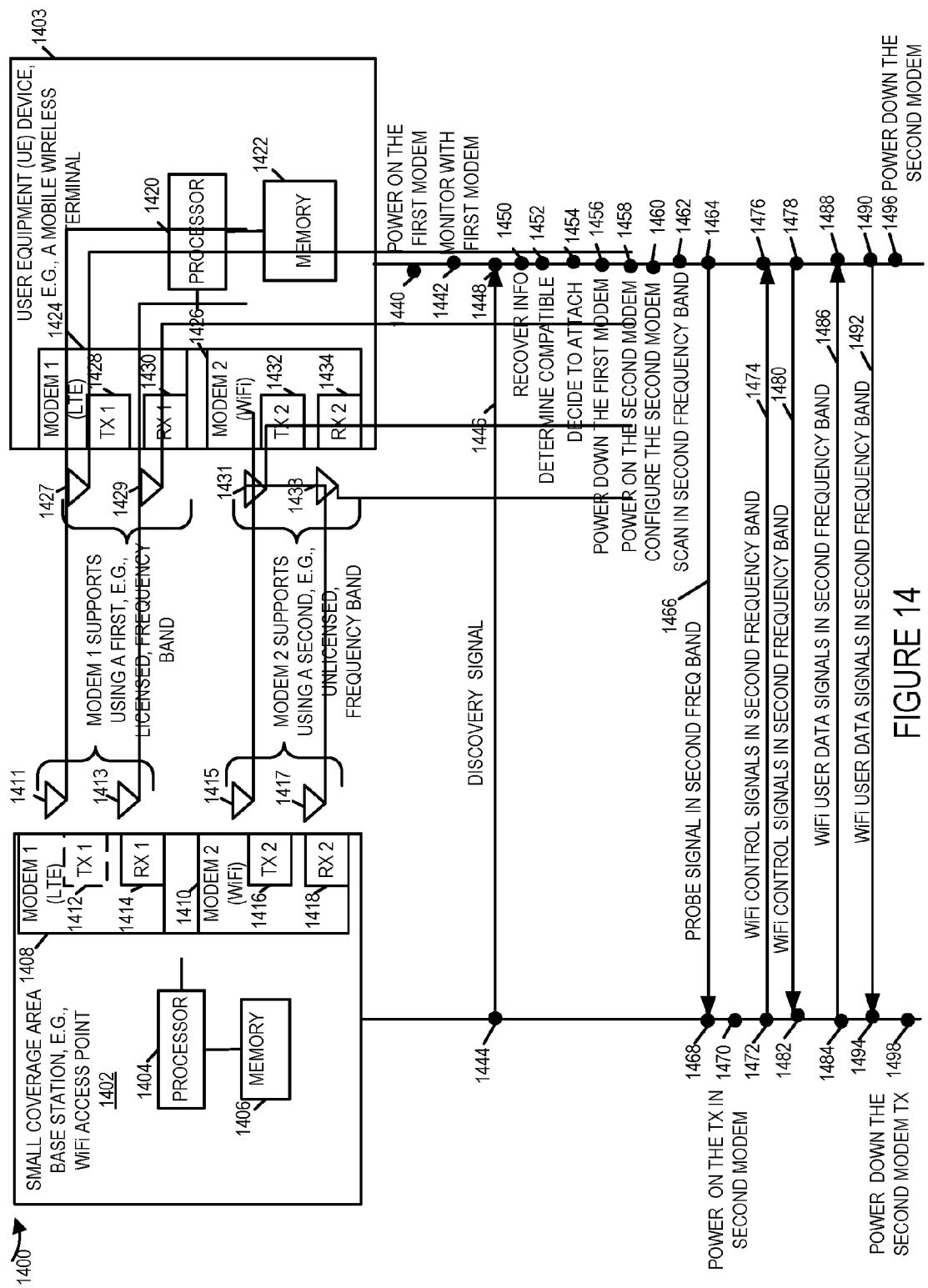
FIG. 14 illustrates an example of operating UE device in accordance with an exemplary embodiment.

Drawing 1400 of FIG. 14 illustrates an example of operating UE device 1403, in accordance with an exemplary embodiment. UE device 1403 is, e.g., a UE device implementing a method in accordance with flowchart 200 of FIG. 2 and/or implemented in accordance with UE device 300 of FIG. 3. An exemplary wireless communications system includes a macro cell base station, small coverage area base station 1402, e.g., a WiFi access point, which is located within the macro cell corresponding to macro BS, and a user equipment (UE) device 1403, e.g., a mobile wireless terminal such as a smartphone. Small coverage area base station 1402 includes a processor 1404, memory 1406, a first modem, modem 1 1408 which is an LTE modem, and a second modem, modem 2 1410, which is a WiFi modem. The modems (1408 and 1410) are coupled to the processor 1404. Modem 1 1408 includes a transmitter module, TX 1 1412 coupled to transmit antenna 1411 for transmitting LTE signals in a first frequency band, e.g., a licensed frequency band. Modem 1 1408 includes a receiver module, RX 1 1414 coupled to receive antenna 1413 for receiving L TE signals in the first frequency band. Modem 2 1410 includes a transmitter module, TX 2 1416 coupled to transmit antenna 1415 for transmitting WiFi signals in a second frequency band, e.g., an unlicensed frequency band. Modem 2 1410 includes a receiver module, RX 2 1418 coupled to receive antenna 1417 for receiving WiFi signals in the second frequency band.

UE device 1403 includes a processor 1420, memory 1422, a first modem, modem 1 1424 which is an LTE modem, and a second modem, modem 2 1426, which is a WiFi modem. The modems (1424 and 1426) are coupled to the processor 1420. Modem 1 1424 includes a transmitter module, TX 1 1428 coupled to transmit antenna 1427 for transmitting LTE signals in a first frequency band, e.g., a licensed frequency band. Modem 1 1424 includes a receiver module, RX 1 1430 coupled to receive antenna 1429 for receiving LTE signals in the first frequency band. Modem 2 1426 includes a transmitter module, TX 2 1432 coupled to transmit antenna 1431 for transmitting WiFi signals in a second frequency band, e.g., an unlicensed frequency band. Modem 2 1426 includes a receiver module, RX 2 1434 coupled to receive antenna 1433 for receiving WiFi signals in the second frequency band.

In step 1440, the UE device 1403 powers on the first modem, modem 1 1424. In step 1442 the UE device monitors with the first modem for discovery signals from small coverage area base station using the first modem 1430, e.g., the receiver module 1430 of the first modem 1424. In step 1444 the small coverage area base station 1402 transmits a discovery signal 1446 via the first frequency band in accordance with an LTE protocol. In some embodiments, discovery signal 1446 is in accordance with discovery signal 800 of FIG. 8. In step 1448, the UE device 1403 receives discovery signal 1446 in modem 1 1424. In step 1450 the UE device 1403 recovers the information communicated in signal 1446 including information indicating the small coverage area base station 1402 is a WiFi AP. In step 1452 UE device 1403 determines that it supports communications with small coverage area BS 1402, e.g., it is compatible since both devices (1402 and 1403) include WiFi 802.11 modems.

In step 1454, the UE device 1403 decides that it intends to attach to small coverage area BS 1402. In step 1456, the UE device 1403 powers down modem 1 1424, and in step 1458 the UE device 1403 powers on modem 2 1426. In step 1460, the UE device 1403 configures modem 2 1426 in accordance with information recovered from discovery signal 1446.

In step 1462 UE device 1403 scans the second communications band for a signal from the small coverage area BS 1402. In this example, there are no other UE devices currently attached to the small coverage area BS 1402, and BS 1402 has TX module 1416 of modem 2 1410 powered down to conserve power. Since UE device does not detect a signal from BS 1402 during the monitoring, UE device generates and transmits probe signal 1466, e.g., a WiFi signal in the second communications band, in step 1464. Small coverage area BS 1402 detects probe signal 1466 in step 1468, and in response, in step 1470 the small coverage area BS 1402 powers on transmitter module TX 2 1416 in modem 2 1410.

Small coverage area BS 1402 transmits WiFi control signals 1474 in the second communications band, as indicated by step 1472. UE device receives WiFi control signals 1474 and recovers the communicated information in step 1476. UE device 1403 transmits WiFi control signals 1480 in the second communications band, as indicated by step 1478. Small coverage area BS 1402 receives WiFi control signals 1480 and recovers the communicated information in step 1482. Small coverage area BS 1402 transmits WiFi user data signals 1486, e.g., traffic signals, in the second communications band, as indicated by step 1484. UE device 1403 receives WiFi user data signals 1486 and recovers the communicated information in step 1488. UE device 1403 transmits WiFi user data signals 1492, e.g., traffic signals, in the second communications band, as indicated by step 1490. Small coverage area BS 1402 receives WiFi user data signals 1492 and recovers the communicated information in step 1494.

At some point communications is terminated between the small coverage area BS 1402 and UE device 1403, e.g., for any number of reasons including, e.g., a decision to terminate by UE device 1403, a decision to terminate by small coverage area BS 1402, or a loss of communications because of poor channel conditions. In response to the termination of communications, UE device 1403, in step 1496 powers down the second modem 1426. In response to the termination of communications, in step 1498, the small coverage area base station 1402 powers down the TX module 1416 in second modem 1410 provided there are no other UE devices currently attached to the small coverage area bas station.

In various embodiments, if there are no UE devices attached to the small coverage area BS 1402, the small coverage area base station 1402 controls the TX module 1416 in modem 2 1410 to be powered down. In some embodiments, small coverage area BS 1402 controls TX 1 module 1412 of modem 1 1408 to be powered down when not being operated to transmit discovery signal 1444.

FIG. 15 is a drawing 1500 illustrating some exemplary frequency bands and some exemplary air link resources in accordance with an exemplary embodiment. Vertical axis 1502 represents frequency, while horizontal axis 1504 represents time. Block 1510 represents exemplary air link resources corresponding to first frequency band 1506, e.g., a licensed frequency band. Block 1508 represents exemplary air link resources corresponding to second frequency band 1508, e.g., unlicensed frequency band. The air link resources of block 1510 are to be used primarily for macro cell base station I VE device communications including macro cell user data signaling, e.g., traffic signaling. In addition, a small portion of the resources of block 1510 are to be used for signaling to facilitate communications between various small coverage area base stations and UE devices. Signaling in first communications band 1506 uses a first communications protocol, e.g., an LTE protocol.

The air link resources of block 1512 are to be used for small coverage area base station, e.g., WiFi AP, I VE device communications including user data signaling, e.g., traffic signaling. Signaling in first communications band 1506 uses a second communications protocol, e.g., an 802.11 WiFi protocol.

Various aspects and/or features of some, but not necessarily all embodiments, are further discussed below. Some exemplary methods and apparatus are directed to discovering small coverage area base stations, e.g., femto cell base stations, pico cell base stations, micro cell base stations, WiFi access points, Bluetooth access Points, etc., in an efficient way. Various exemplary methods are efficient in one or more of the following ways. Some exemplary methods are power efficient for idle user equipment (UE) devices. Various exemplary methods are efficient in that the method eliminates time wasted in searching for the small coverage area base stations; thus improving the throughput as well as battery life. Some exemplary method and/or apparatus are power efficient in that the method improves power consumption of asynchronous access points such as WiFi access points.

In various embodiments, the small access base stations, e.g., femto cell base stations, pico cell base stations, micro cell base stations, WiFi access points, Bluetooth access Points, etc., can transmit or at least receive and decode on the primary carrier of the macro base station in whose macro cell the small coverage area base station is located, e.g., using the macro cell's technology. For example, a WiFi access point located within an LTE macro cell, can also listen and decode LTE signals.

In some embodiments, a macro cell base station assigns a group of resources in a primary carrier's UL band. The UE devices pick one of the resources and transmit periodically.

In some embodiments, a macro cell base station assigns multiple groups of resources, e.g., discovery resources, with multiple periodicities. In some embodiments, the macro cell base station assigns a first group, e.g., a group for active UE devices, to a first periodicity between resources, e.g., discovery resources, and assigns a second group, e.g., a group reserved for idle UE devices, to a second periodicity between resources, e.g., discovery resources, and the first periodicity is shorter than the second periodicity.

In some embodiments, each of the UE devices transmit in the resources irrespective of the macro cell or small cell they are associated with. In some other embodiments only a subset of the UE devices to transmit in these resources. For example, only the UE devices attached to a macro cell base station or camped on a macro cell base station can transmit. In another example, each of the UE devices except for those attached to a WiFi access point can transmit.

In some embodiments, the UE device transmits its identity, e.g., S-TMSI, its capability, e.g. modems it can support, and its network identity, e.g., PLMN identity. The UE device transmits enough information so that it can be contacted. In some embodiments, the UE device may also transmit the type of quality of service (QoS) it requires.

In some embodiments, small coverage area base stations monitor the periodic resources, e.g., the periodic discovery resources being used by UE devices, on the primary carrier and discover the UE devices. In some such embodiments, a small coverage area base station determines whether the discovered UE device can attach to it. In some embodiments, the small coverage area base station communicates information to access the small coverage area base station to the discovered UE through MME. In some embodiments, the information to access the small coverage area base station can, and in some embodiments, does differ depending upon the particular type of small coverage area base station. For example, the information communicated to a UE device to access a wifi access point includes, e.g., the band used by the AP, its SSID, the WPA key, etc; and the information communicated to the UE to access a LTE femto base station info includes, e.g., the carrier on which femto base station is transmitting, PLMN id, cell ID and relevant parts of MIB/SIB.

In some embodiments, if a small coverage area base station does not have any UE devices attached to it and the small coverage area base station does not discover any UE devices, the small coverage area base station can sleep until the next periodic discovery resource. Thus the small coverage area base station goes into a low power mode of operation.

In some embodiments, a UE device upon receiving the information a small coverage area base station, determines whether or not to access small coverage area base station. If the UE decides to access the small coverage area base station, the UE device activates the relevant modem, corresponding to the small coverage area base station, and accesses the small coverage area base station.

In some embodiments, the macro cell base station does not assign any dedicated resources for UE device transmissions. In some such embodiments, the small coverage area base stations listen for UE specific signals in the UL of primary channel, e.g., the macro uplink, and communicate their measurements to the macro cell base station. The macro cell base station can then determine the UE device that transmitted that signal and communicate the small coverage area base station information to the UE device.

In some embodiments, the macro cell base station assigns the resources in which the small coverage area base station can also transmit. In some such embodiments, small coverage area base stations then transmit the information required by UE device to access the small coverage area base station.

In some embodiments, a base station, e.g., a small coverage area base station and/or a macro cell base station, monitors for UE device transmissions, e.g., discovery signals, in a portion of an UL band of a macro cell to discover the presence of UE devices. In some such embodiments, a signal is then sent to the UE device from the base station informing the detected UE device of small coverage area base stations in the area of the UE device; the UE device then decides whether or not to use one or more of the small coverage area base stations in the area.

In some embodiments, the transmitted discovery signal from the UE device includes information about the capabilities of the UE device, e.g., which modems are included in the UE device, which communications protocols the UE device supports, and/or which communications bands the UE device supports. In some such embodiments, the base stations uses the information from the UE device to select and identify which small coverage area base stations are compatible with the UE device, and forwards information about the compatible small coverage area base stations.

In some embodiments, information communicated from the base station to the detected UE device includes information which allows the UE device to access an identified small coverage area base station.

Various embodiments are directed to an exemplary system where a first base station, e.g., a small coverage area base station such as a femto base station or WiFi AP, monitors for UE device signals transmitted by UE devices in a first frequency band used by a second base station, e.g., macro base station, to detect the presence of a UE device in the area of the first base station. The first base station, in some embodiments, uses a second frequency band, e.g., WiFi frequency band, which is different from the first frequency band, e.g., macro uplink frequency band, for communication of user data, e.g., traffic data, to/from UE devices. In some embodiments the second frequency band is not used by said second base station, e.g., the macro BS, for communicating with the UE device. The first base station may be in a power conservation mode of operation, e.g., with its transmitter module powered down, when monitoring for UE device signals in the first frequency band. The first base station, e.g., the small coverage area base station, in response to detecting a UE device signal in the first frequency band, sends information to the UE device which transmitted the detected signal. The communication of the information may be via the second base station, e.g., macro base station, which is provided the information to communicate from the first base station, e.g. small coverage area base station, via a backhaul link or transmitted directly to the UE device. The information may be, e.g., information to make the UE device aware of the presence and/or identity of the first base station, and, optionally, information which can be used by the UE device to access the first base station, e.g., information about the frequency and/or communications resources which can be used to access the first base station, e.g., the small coverage area base station. In some embodiments the first base station, e.g., small coverage area base station, transmits such information in a frequency band used by the second base station, e.g., macro base station, but then uses the second frequency band for the communication of user data, e.g., voice, text, images and/or video. Since the first base station, e.g., small coverage area base station, may switch from a low power monitoring mode to a fully transmit/receive mode in response to detection of a signal, e.g., a signal indicating a UE device ID and/or device capability information, from a UE device in the first (macro) frequency band, the first base station can operate in a low power mode and not transmit signals when UE devices are not within the coverage area of the first base station. The UE signals detected by the first base station may be device to device discovery signals transmitted to support device to device communication using the macro frequency band and/or signals transmitted to the macro base station, e.g., as part of an access request or other signaling operation.

Depending on the particular embodiment a small coverage area base station will include a receiver capable of monitoring the first (macro) frequency band and both a transmitter and receiver for communicating with UE devices in the second frequency band, e.g., a femto or WiFi band. The first base station, depending on the particular embodiment, may or may not have a backhaul connection to the second (macro) base station or a transmitter capable of transmitting information in the first (macro) frequency band.

It should be appreciated that the methods and apparatus described herein allow a small coverage area base station to detect the presence of UE devices in the proximity of the small coverage area base station and to communicate information to detected UE devices without requiring the UE devices to transmit discovery information in the frequency band used by the small coverage area base station and without requiring the UE device to switch to and/or monitor the frequency band used by the small coverage area base station to communicate user data. Furthermore, a small coverage area base station need not transmit discovery signals on a routine or periodic basis in either the first frequency band or the second frequency band when UE devices are not detected within the coverage area of the small coverage area base station thereby reducing and/or avoiding interference which is caused by such transmissions.

The techniques of various embodiments may be implemented using software, hardware and/or a combination of software and hardware. Various embodiments are directed to apparatus, e.g., user equipment (UE) devices including mobile nodes such as mobile wireless terminals, base stations including maco base stations and small coverage area base stations, e.g., femto base stations, pico base stations, micro base station, WiFi access point, Bluetooth access points, e.g., network nodes, and communications system. Various embodiments are also directed to methods, e.g., method of controlling and/or operating a communications device, e.g., a user equipment (UE) device such as a mobile wireless terminal, e.g., a smartphone including a plurality of modems, a base station such as a small coverage area base station, e.g., a femto cell base station, pico base station, a micro base station, a WiFi AP, a Bluetooth AP, etc, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above described method(s). Some embodiments are directed to a device including a processor configured to implement one, multiple or all of the steps of one or more methods of the invention.

In some embodiments, the processor or processors, e.g., CPUs, of one or more devices, e.g., communications devices such as a user equipment (UE) device, e.g., a smartphone, and/or base stations, e.g., a small coverage area base station, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment device, e.g., a smartphone with multiple modems, or a base station, e.g., a small coverage area base station, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a user equipment device, e.g., a wireless terminal, or node, e.g., a base station such as a small coverage area base station. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between base stations and user equipment devices, e.g., mobile nodes. In some embodiments, some of the base stations, e.g., some of the small coverage area base stations are implemented as access points, e.g., WiFi APs or Bluetooth APs or other APs, which establish communications links with user equipment devices, e.g., mobile nodes, using OFDM and/or CDMA. In various embodiments the mobile nodes are implemented as notebook computers, personal data assistants (PDAs), smartphones, tablets, pads, or other portable devices including receiver/transmitter circuits and logic and/or routines, for implementing the methods.

What is claimed is:

1. A method for wireless communication of operating a first base station, the method comprising:
monitoring, by said first base station, a first frequency band used by a second base station to detect a signal transmitted by a UE device in said first frequency band, said first frequency band being a frequency band used by said second base station but which is unused by said first base station to communicate user data; and
communicating, by said first base station via said first frequency band using a first communications protocol, information about said first base station to said UE device in response to detecting a signal transmitted by a UE device in said first frequency band, said information including communications protocol information associated with a second communications protocol different from said first communications protocol.

2. The method of claim 1, wherein said information about said first base station includes first base station identification information.

3. The method of claim 1, wherein said information about said first base station further includes information indicating communications resources which can be used to access said first base station.

4. The method of claim 1, wherein communicating information about said first base station to said UE device includes:
sending a signal to said second base station to cause said second base station to transmit said information to said UE device.

5. An apparatus for wireless communications associated with a first base station, comprising:
means for monitoring a first frequency band used by a second base station to detect a signal transmitted by a UE device in said first frequency band, said first frequency band being a frequency band used by said second base station but which is unused by said first base station to communicate user data; and
means for communicating, via said first frequency band using a first communications protocol, information about said first base station to said UE device in response to detecting a signal transmitted by a UE device in said first frequency band, said information including communications protocol information associated with a second communications protocol different from said first communications protocol.

6. The apparatus of claim 5, wherein said information about said first base station includes first base station identification information.

7. The apparatus of claim 5, wherein said information about said first base station further includes information indicating communications resources which can be used to access said first base station.

8. The apparatus of claim 5, wherein said means for communicating information about said first base station to said UE device includes:
means for sending a signal to said second base station to cause said second base station to transmit said information to said UE device.

9. A non-transitory computer- readable medium storing code for wireless communications at a first base station, said code comprising instructions executable to:
monitor a first frequency band used by a second base station to detect a signal transmitted by a UE device in said first frequency band, said first frequency band being a frequency band used by said second base station but which is unused by said first base station to communicate user data; and
communicate, via said first frequency band using a first communications protocol, information about said first base station to said UE device in response to detecting a signal transmitted by a UE device in said first frequency band, said information including communications protocol information associated with a second communications protocol different from said first communications protocol.

10. An apparatus for wireless communications associated with a first base station, comprising:
- at least one processor;
- memory in electronic communication with said at least one processor; and
- instructions stored in said memory, wherein said instructions are executable by said at least one processor to:
  - monitor a first frequency band used by a second base station to detect a signal transmitted by a UE device in said first frequency band, said first frequency band being a frequency band used by said second base station but which is unused by said first base station to communicate user data; and
  - communicate, via said first frequency band using a first communications protocol, information about said first base station to said UE device in response to detecting a signal transmitted by a UE device in said first frequency band, said information including communications protocol information associated with a second communications protocol different from said first communications protocol.

11. The apparatus of claim 10, wherein said information about said first base station includes first base station identification information.

12. The apparatus of claim 10, wherein said information about said first base station further includes information indicating communications resources which can be used to access said first base station.

13. The method of claim 1, wherein said first base station is a small coverage area base station.

14. The method of claim 1, wherein said information about said first base station further includes information identifying air link resource structure associated with a second frequency band different from said first frequency band.

15. The method of claim 1, wherein said second base station is a macro base station.

16. The apparatus of claim 10, wherein said first base station is a small coverage area base station.

17. The apparatus of claim 10, wherein said information about said first base station further includes information identifying air link resource structure associated with a second frequency band different from said first frequency band.

18. The apparatus of claim 10, wherein said second base station is a macro base station.

* * * * *